(12) United States Patent
Kesho et al.

(10) Patent No.: US 8,749,726 B2
(45) Date of Patent: Jun. 10, 2014

(54) LIQUID CRYSTAL DISPLAY DEVICE

(71) Applicants: Masato Kesho, Kanazawa (JP);
Masanobu Nonaka, Nonoichi (JP);
Kazuhiro Takahashi, Kanazawa (JP);
Toshimasa Yonekura, Kanazawa (JP)

(72) Inventors: Masato Kesho, Kanazawa (JP);
Masanobu Nonaka, Nonoichi (JP);
Kazuhiro Takahashi, Kanazawa (JP);
Toshimasa Yonekura, Kanazawa (JP)

(73) Assignee: Japan Display Inc., Tokyo (JP)

( * ) Notice: Subject to any disclaimer, the term of this patent is extended or adjusted under 35 U.S.C. 154(b) by 37 days.

(21) Appl. No.: 13/676,566

(22) Filed: Nov. 14, 2012

(65) Prior Publication Data

US 2013/0128171 A1    May 23, 2013

(30) Foreign Application Priority Data

Nov. 21, 2011   (JP) ................. 2011-254335

(51) Int. Cl.
*G02F 1/1343* (2006.01)

(52) U.S. Cl.
USPC ........................................... 349/38; 349/39

(58) Field of Classification Search
USPC ...................................... 349/38–39
See application file for complete search history.

(56) References Cited

U.S. PATENT DOCUMENTS

| 6,266,116 B1 | 7/2001 | Ohta et al. |
| 7,944,513 B2 | 5/2011 | Ishii |
| 2001/0010575 A1 | 8/2001 | Yoshida et al. |
| 2004/0165136 A1 | 8/2004 | Sugiyama et al. |
| 2005/0206824 A1 | 9/2005 | Son et al. |
| 2005/0219453 A1 | 10/2005 | Kubo et al. |
| 2007/0115234 A1 | 5/2007 | Kim et al. |
| 2008/0062358 A1 | 3/2008 | Lee et al. |
| 2008/0180590 A1 | 7/2008 | Lee et al. |
| 2008/0180623 A1 | 7/2008 | Lee et al. |
| 2008/0186439 A1 | 8/2008 | Kwon et al. |

FOREIGN PATENT DOCUMENTS

| JP | 6-222397 | 8/1994 |
| JP | 7-159807 | 6/1995 |
| JP | 9-160041 | 6/1997 |
| JP | 9-160042 | 6/1997 |
| JP | 9-160061 | 6/1997 |
| JP | 10-26765 | 1/1998 |
| JP | 10-90708 | 4/1998 |
| JP | 2005-3802 | 1/2005 |
| JP | 3644653 | 2/2005 |
| JP | 2005-242307 | 9/2005 |
| JP | 2009-42630 | 2/2009 |
| JP | 2009-192822 | 8/2009 |

OTHER PUBLICATIONS

U.S. Appl. No. 13/548,644, filed Jul. 13, 2012, Kesho, et al.
U.S. Appl. No. 13/589,597, filed Aug. 20, 2012, Yonekura, et al.
U.S. Appl. No. 13/590,643, filed Aug. 21, 2012, Kesho, et al.
U.S. Appl. No. 13/603,942, filed Sep. 5, 2012, Kesho, et al.
U.S. Appl. No. 13/614,344, filed Sep. 13, 2012, Kesho, et al.
U.S. Appl. No. 13/645,734, filed Oct. 5, 2012, Kesho, et al.

*Primary Examiner* — Phu Vu

(74) *Attorney, Agent, or Firm* — Oblon, Spivak, McClelland, Maier & Neustadt, L.L.P.

(57) ABSTRACT

According to one embodiment, a liquid crystal display device includes a first substrate including a first storage capacitance line and a second storage capacitance line, a gate line located between the first storage capacitance line and the second storage capacitance line, a semiconductor layer located at a substantially central part of a pixel, a source line put in contact with the semiconductor layer, a drain electrode which is put in contact with the semiconductor layer and extends above the first storage capacitance line and the second storage capacitance line, and a pixel electrode including a first main pixel electrode opposed to the first storage capacitance line, and a second main pixel electrode opposed to the second storage capacitance line.

20 Claims, 11 Drawing Sheets

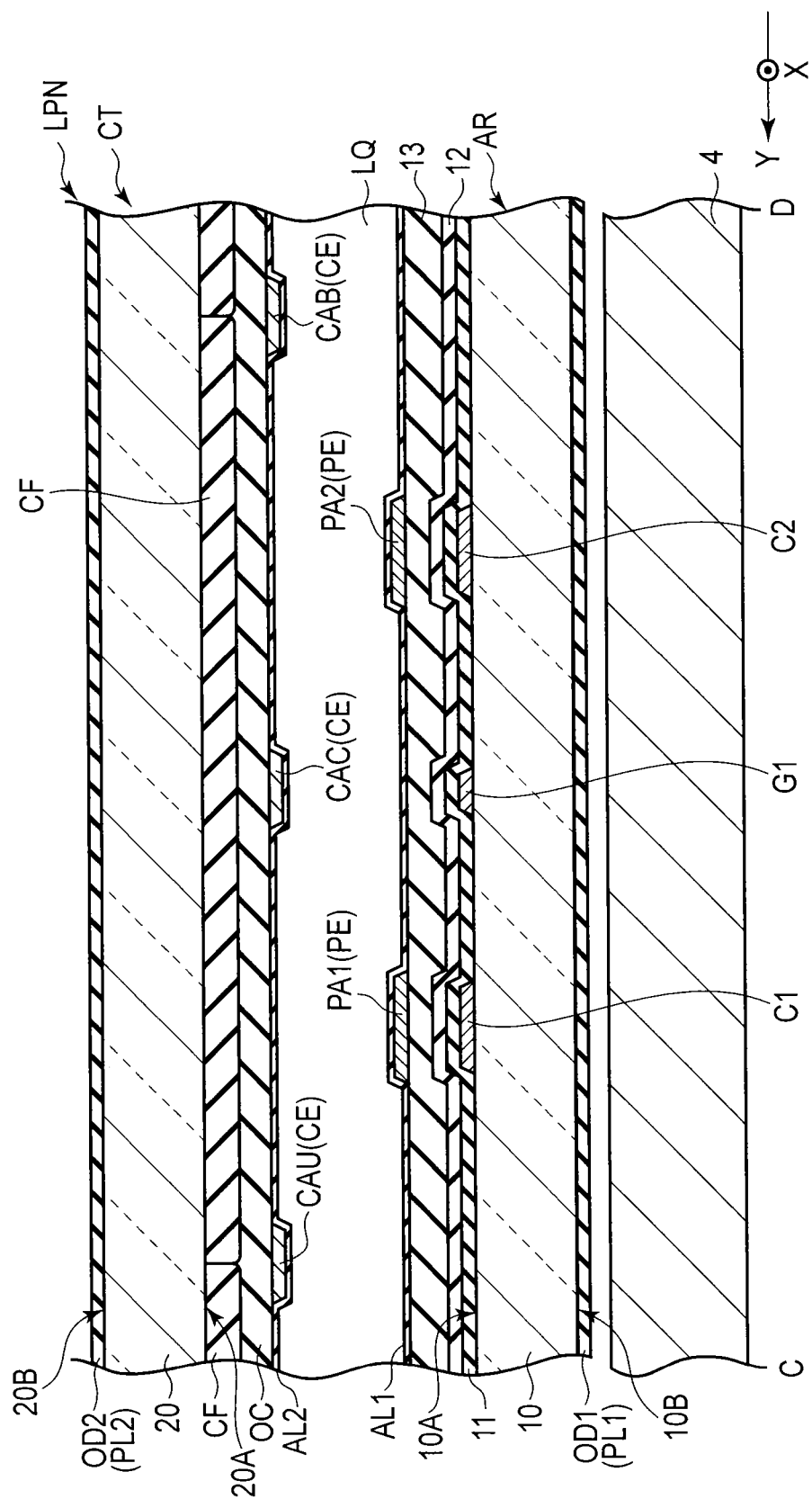
F I G. 5A

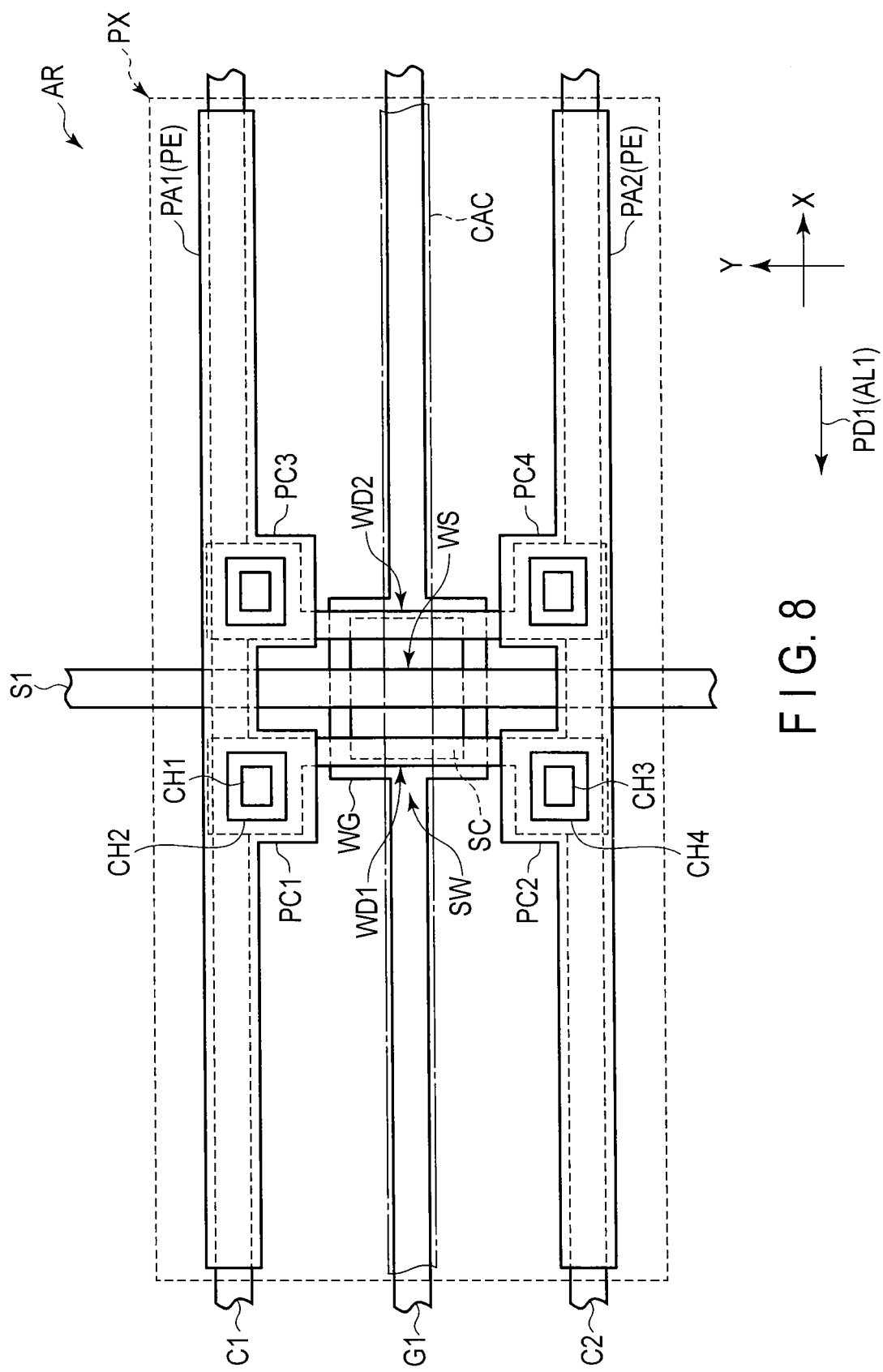
F I G. 8

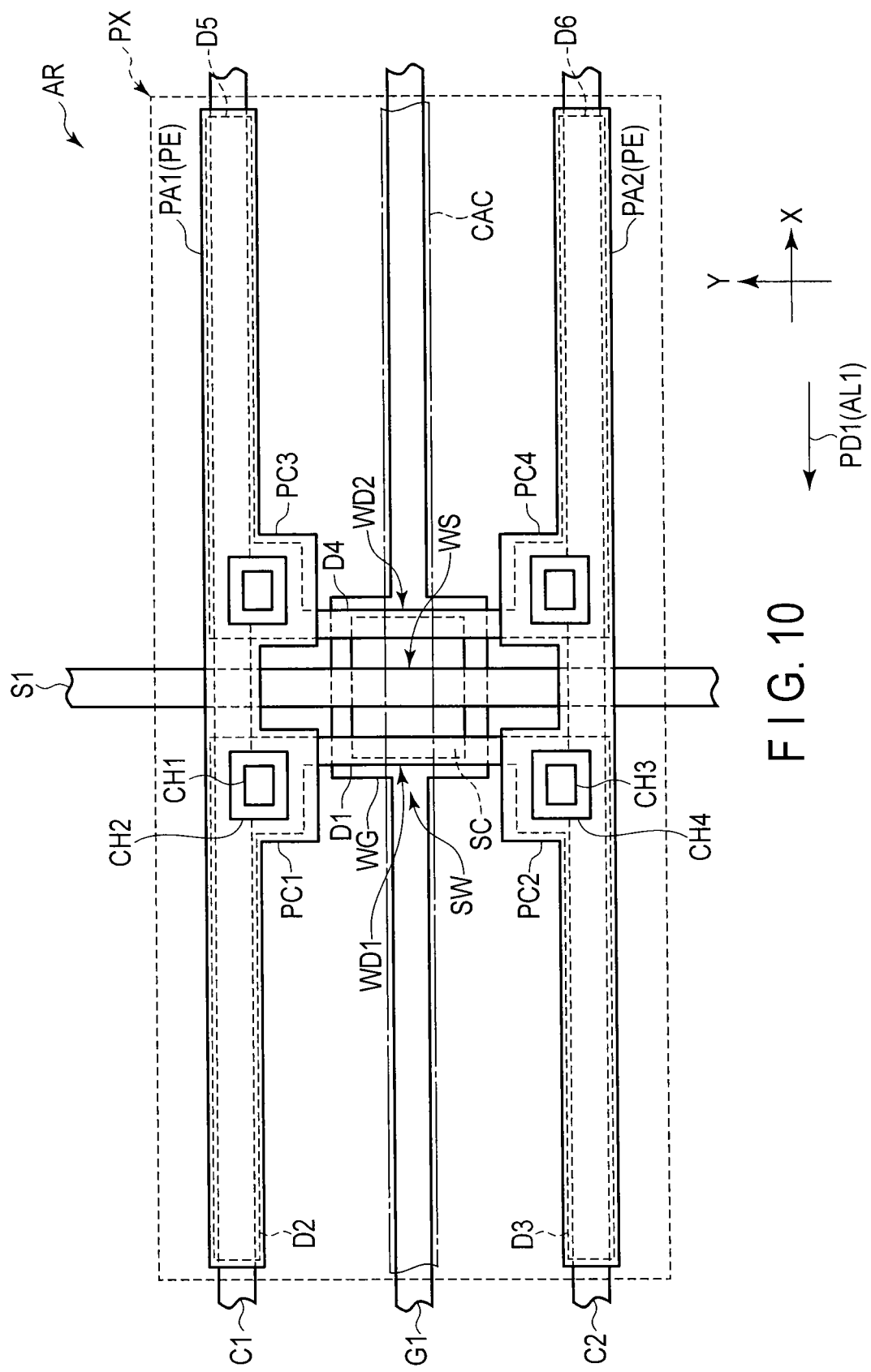
F I G. 10

LIQUID CRYSTAL DISPLAY DEVICE

CROSS-REFERENCE TO RELATED APPLICATIONS

This application is based upon and claims the benefit of priority from Japanese Patent Application No. 2011-254335, filed Nov. 21, 2011, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique wherein a lateral electric field or an oblique electric field is produced between a pixel electrode formed on an array substrate and a counter-electrode formed on a counter-substrate, thereby switching liquid crystal molecules.

BRIEF DESCRIPTION OF THE DRAWINGS

FIG. 5A is a schematic cross-sectional view, taken along line C-D in FIG. 3, showing a cross-sectional structure of a liquid crystal display panel shown in FIG. 3.

FIG. 8 is a plan view which schematically shows another structure example of the pixel at a time when the array substrate shown in FIG. 1 is viewed from the counter-substrate side.

FIG. 10 is a plan view which schematically shows another structure example of the pixel at a time when the array substrate shown in FIG. 1 is viewed from the counter-substrate side.

DETAILED DESCRIPTION

Figure 1:
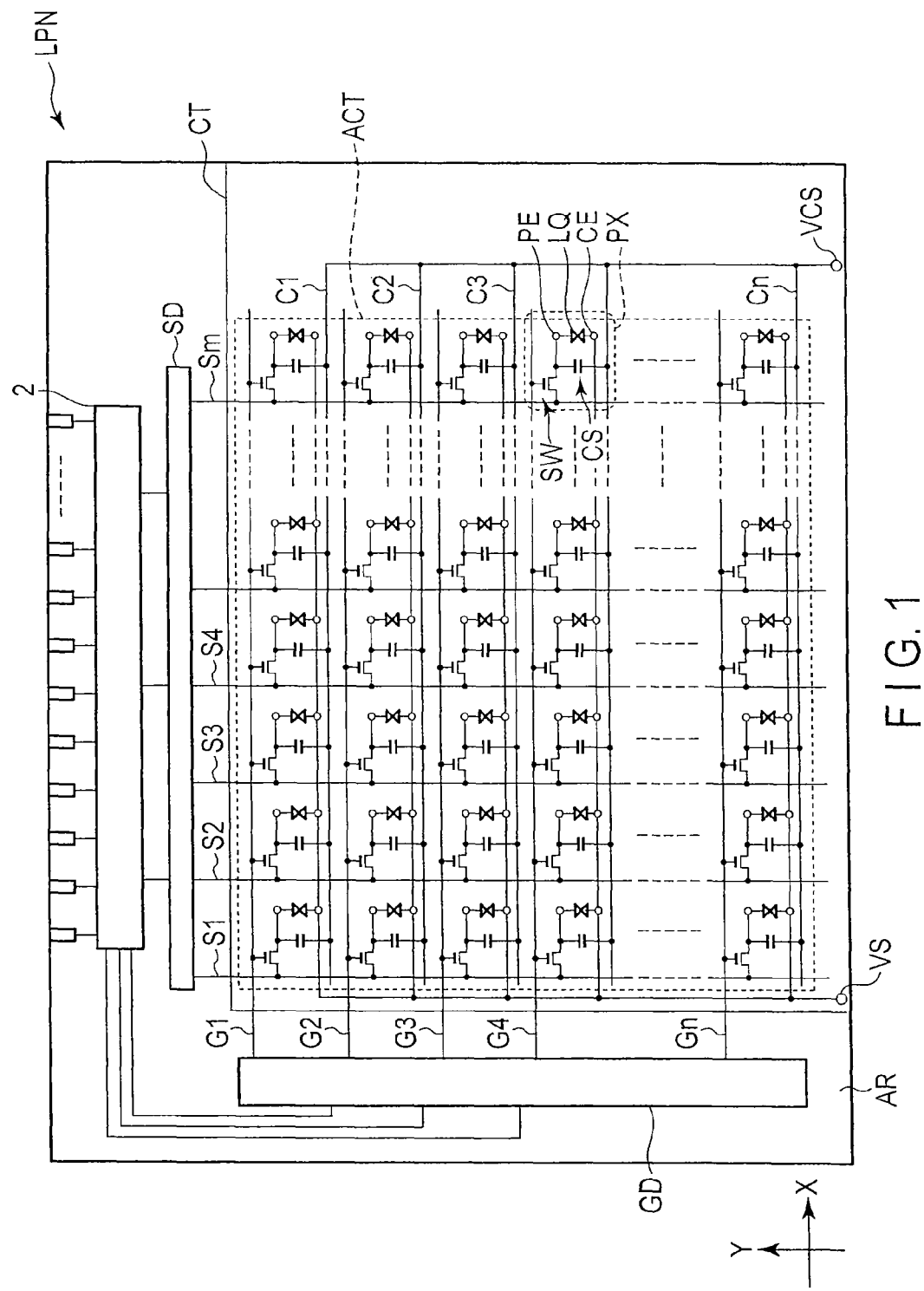
FIG. 1 is a view which schematically illustrates a structure and an equivalent circuit of a liquid crystal display device according to an embodiment.

In general, according to one embodiment, a liquid crystal display device includes: a first substrate including a first storage capacitance line and a second storage capacitance line each extending in a first direction, a gate line which is located between the first storage capacitance line and the second storage capacitance line and extends in the first direction, a semiconductor layer which is located at a substantially central part of a pixel and located above the gate line, a source line which is put in contact with the semiconductor layer and extends in a second direction crossing the first direction, a drain electrode which is put in contact with the semiconductor layer and extends above the first storage capacitance line and the second storage capacitance line, and a pixel electrode including a first main pixel electrode which is electrically connected to the drain electrode, is opposed to the first storage capacitance line and extends in the first direction, and a second main pixel electrode which is electrically connected to the drain electrode, is opposed to the second storage capacitance line and extends in the first direction; a second substrate including a common electrode, the common electrode including main common electrodes which extend in the first direction and are located on both sides of the first main pixel electrode and on both sides of the second main pixel electrode; and a liquid crystal layer held between the first substrate and the second substrate.

According to another embodiment, a liquid crystal display device includes: a first substrate including a first storage capacitance line and a second storage capacitance line each extending in a first direction, a gate line which is located between the first storage capacitance line and the second storage capacitance line and extends in the first direction, a semiconductor layer which is located at a substantially central part of a pixel and located above the gate line, a source line which is put in contact with the semiconductor layer and extends in a second direction crossing the first direction, a drain electrode including a first drain electrode and a second drain electrode configured such that the source line is located between the first drain electrode and the second drain electrode, the first drain electrode being in contact with one end portion of the semiconductor layer and extending above the first storage capacitance line and the second storage capacitance line, the second drain electrode being in contact with the other end portion of the semiconductor layer and extending above the first storage capacitance line and the second storage capacitance line, and a pixel electrode including a first main pixel electrode which is electrically connected to the first drain electrode and the second drain electrode, is opposed to the first storage capacitance line and extends in the first direction, and a second main pixel electrode which is electrically connected to the first drain electrode and the second drain electrode, is opposed to the second storage capacitance line and extends in the first direction; a second substrate including a common electrode, the common electrode including main common electrodes which extend in the first direction and are located on both sides of the first main pixel electrode and on both sides of the second main pixel electrode; and a liquid crystal layer held between the first substrate and the second substrate.

According to another embodiment, a liquid crystal display device includes: a first substrate including a first storage capacitance line and a second storage capacitance line each extending in a first direction, a gate line which is located between the first storage capacitance line and the second storage capacitance line and extends in the first direction, a semiconductor layer which is located at a substantially central part of a pixel and located above the gate line, a source line which is put in contact with the semiconductor layer and extends in a second direction crossing the first direction, a drain electrode which is put in contact with the semiconductor layer and extends above the first storage capacitance line and the second storage capacitance line, and a pixel electrode disposed in the pixel having a laterally elongated shape with a greater length in the first direction than in the second direction, the pixel electrode including a first main pixel electrode which is electrically connected to the drain electrode, is opposed to the first storage capacitance line and extends in the first direction, and a second main pixel electrode which is electrically connected to the drain electrode, is opposed to the second storage capacitance line and extends in the first direction; a second substrate including a common electrode, the common electrode including main common electrodes which extend in the first direction and are located on both sides of the first main pixel electrode and on both sides of the second main pixel electrode; and a liquid crystal layer held between the first substrate and the second substrate.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image.

The active area ACT is composed of a plurality of pixels PX which are arrayed in a matrix of m×n (m and n are positive integers).

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C correspond to signal lines which extend, for example, substantially linearly in a first direction X. The gate lines G and storage capacitance lines C neighbor at intervals along a second direction Y crossing the first direction X. In this example, the first direction X and the second direction Y are substantially perpendicular to each other. The source lines S cross the gate lines G and storage capacitance lines C. The source lines S correspond to signal lines which extend substantially linearly along the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied. In the meantime, as regards the storage capacitance line C for forming a capacitance between itself and the pixel electrode PE, a plurality of such storage capacitance lines C may be disposed in each pixel.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE. The electric field, which is produced between the pixel electrodes PE and the common electrode CE, is an oblique electric field which is slightly inclined to an X-Y plane, which is defined by the first direction X and second direction Y, or to a substrate major surface (or a lateral electric field which is substantially parallel to the substrate major surface).

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, amorphous silicon, but it may be formed of polysilicon.

The pixel electrodes PE are disposed in the respective pixels PX, and are electrically connected to the switching elements SW. In the present embodiment, as will be described later in detail, a drain electrode of the switching element SW may function as the pixel electrode PE, or a pixel electrode PE, which is electrically connected to the drain electrode, may be separately provided. In the case of the structure in which the drain electrode functions as the pixel electrode PE, the pixel electrode PE is formed of a wiring material, an opaque electrically conductive material, or an electrically conductive material with a light-blocking property or reflectivity. For example, the pixel electrode PE is formed of at least one metallic material selected from among aluminum (Al), titanium (Ti), silver (Ag), molybdenum (Mo), tungsten (W), copper (Cu) and chromium (Cr), or an alloy including any one of these materials. In addition, in the case where the pixel electrode PE is provided separately from the drain electrode, the pixel electrode PE is formed of a light-transmissive, electrically conductive material such as indium tin oxide (ITO) or indium zinc oxide (IZO), or the above-described wiring material.

The common electrode CE is disposed common to the pixel electrodes PE of plural pixels PX via the liquid crystal layer LQ. The common electrode CE may be formed of a light-transmissive, electrically conductive material such as ITO or IZO, or the above-described wiring material.

The array substrate AR includes a power supply module VS for applying a voltage to the common electrode CE. The power supply module VS is formed, for example, on the outside of the active area ACT. The common electrode CE of the counter-substrate CT is led out to the outside of the active area ACT, and is electrically connected to the power supply module VS via an electrically conductive member (not shown).

Figure 2:
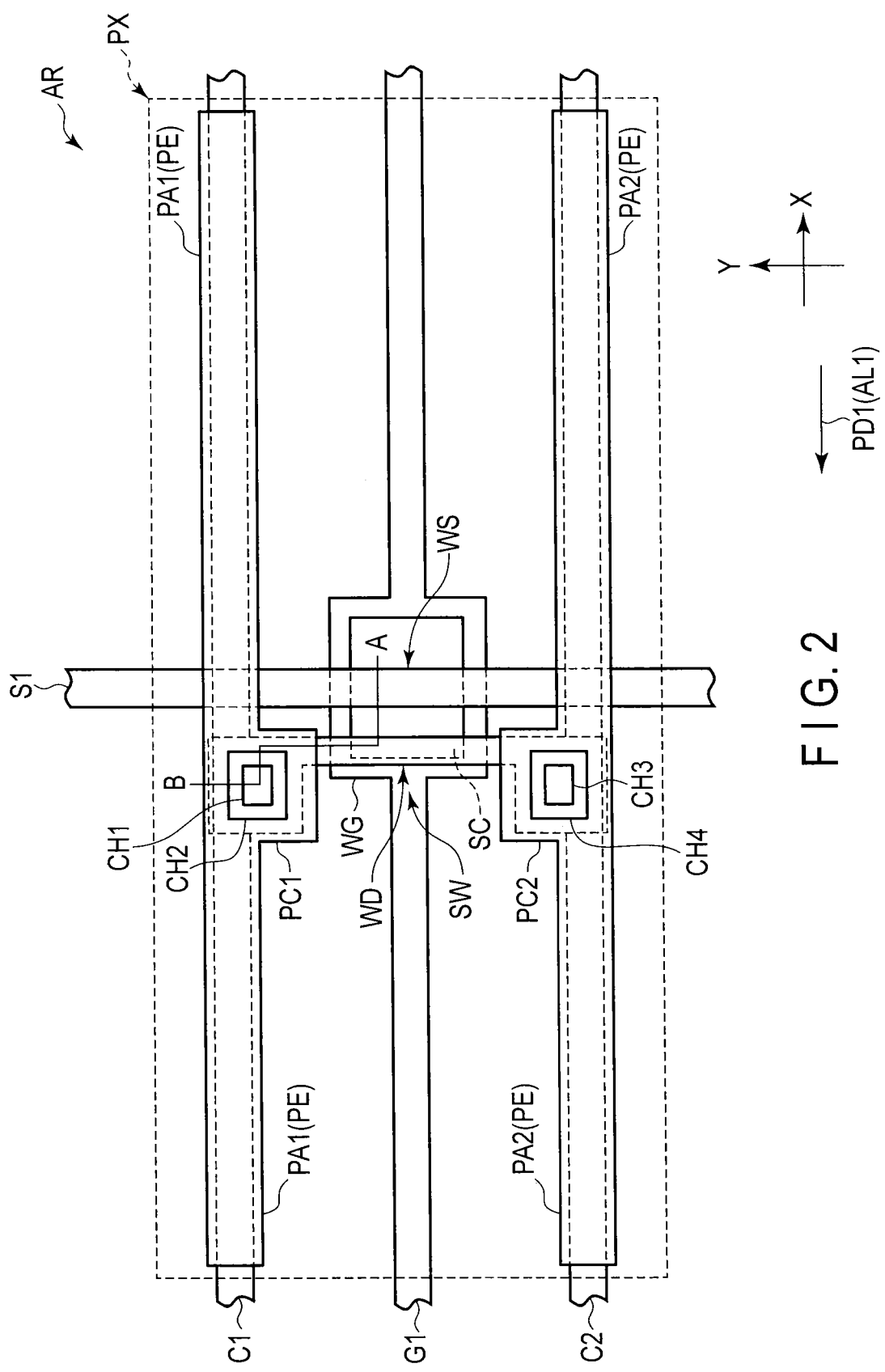
FIG. 2 is a plan view which schematically shows a structure example of a pixel at a time when an array substrate shown in FIG. 1 is viewed from a counter-substrate side.

FIG. 2 is a plan view which schematically shows a structure example of one pixel PX at a time when the array substrate AR shown in FIG. 1 is viewed from the counter-substrate side. FIG. 2 is a plan view in an X-Y plane.

The array substrate AR includes a gate line G1, a storage capacitance line C1, a storage capacitance line C2, a source line S1, a switching element SW, a pixel electrode PE, and a first alignment film AL1.

In the example illustrated, as indicated by a broken line in FIG. 2, the pixel PX has a laterally elongated rectangular shape having a greater length in the first direction X than in the second direction Y. The storage capacitance line C1 and storage capacitance line C2 are disposed with a first pitch along the second direction Y, and each of them extends in the first direction X. The gate line G1 is disposed between the storage capacitance line C1 and storage capacitance line C2, and extends in the first direction X. The source line S1 extends in the second direction Y.

In the pixel PX illustrated, the storage capacitance line C1 is disposed on an upper side area of the gate line G1 in the pixel PX, and the storage capacitance line C2 is disposed on a lower side area of the gate line G1 in the pixel PX. The length of the pixel PX in the second direction Y is greater than the first pitch between the storage capacitance lines. In addition, the gate line G1 is disposed at a substantially middle point between the storage capacitance line C1 and storage capacitance line C2, or at a central part of the pixel. Specifically, the distance in the second direction Y between the storage capacitance line C1 and the gate line G1 is substantially equal to the distance in the second direction Y between the storage capacitance line C2 and the gate line G1. In addition, the source line S1 is located at a central part of the pixel. Specifically, the source line S1 crosses the gate line G1, storage capacitance line C1 and storage capacitance line C2. The position where the source line S1 and gate line G1 cross each other is at a substantially central part of the pixel, and at a substantially middle point between the position where the source line S1 and storage capacitance line C1 cross each other and the position where the source line S1 and storage capacitance line C2 cross each other.

The switching element SW, in the illustrated example, is located at a substantially central part of the pixel PX, and is electrically connected to the gate line G1 and source line S1. The switching element SW includes a gate electrode WG which is electrically connected to the gate line G1, a semiconductor layer SC which is located immediately above the gate electrode WG at a substantially central part of the pixel PX, a source electrode WS which is electrically connected to the source line S1 and is put in contact with the semiconductor layer SC, and a drain electrode WD which is put in contact with the semiconductor layer SC. In the example illustrated, the gate electrode WG is formed integral with the gate line G1, and the source electrode WS is formed integral with the source line S1. In addition, that part of the source electrode WS, which is in contact with the semiconductor layer SC, extends in the second direction Y. The drain electrode WD is spaced apart from the source line S1 or source electrode WS, and extends in the second direction Y. The drain electrode WD extends over the storage capacitance line C1 and storage capacitance line C2.

The pixel electrode PE is electrically connected to the drain electrode WD. The pixel electrode PE includes a main pixel electrode PA1 which is opposed to the storage capacitance line C1 and extends in the first direction X, and a main pixel electrode PA2 which is opposed to the storage capacitance line C2 and extends in the first direction X. The main pixel electrode PA1 includes a contact portion PC1 at a substantially middle position of the pixel PX in the first direction X. The contact portion PC1 is located above one end portion of the drain electrode WD, and is electrically connected to the drain electrode WD via a contact hole CH1 and a contact hole CH2 above the storage capacitance line C1. Similarly, the main pixel electrode PA2 includes a contact portion PC2 at a substantially middle position of the pixel PX in the first direction X. The contact portion PC2 is located above the other end portion of the drain electrode WD, and is electrically connected to the drain electrode WD via a contact hole CH3 and a contact hole CH4 above the storage capacitance line C2. In the example illustrated, the main pixel electrode PA1 is spaced apart from the main pixel electrode PA2. However, since both the main pixel electrode PA1 and the main pixel electrode PA2 are electrically connected to the same drain electrode WD, the same voltage is applied to the main pixel electrode PA1 and the main pixel electrode PA2.

In the main pixel electrode PA1, a part extending from the contact portion PC1 toward a left side end portion of the pixel PX, and a part extending from the contact portion PC1 toward a right side end portion and passing over the source line S1, are opposed to the storage capacitance line C1 and are each formed in a strip shape with a substantially uniform width in the second direction Y. The storage capacitance line C1 forms a capacitance, mainly between itself and the main pixel electrode PA1.

In the main pixel electrode PA2, a part extending from the contact portion PC2 toward the left side end portion of the pixel PX, and a part extending from the contact portion PC2 toward the right side end portion and passing over the source line S1, are opposed to the storage capacitance line C2 and are each formed in a strip shape with a substantially uniform width in the second direction Y. The storage capacitance line C2 forms a capacitance, mainly between itself and the main pixel electrode PA2.

In the meantime, the array substrate AR may further include a part of the common electrode CE.

In the array substrate AR, the pixel electrode PE is covered with the first alignment film AL1. The first alignment film AL1 is subjected to alignment treatment (e.g. rubbing treatment or optical alignment treatment) in a first alignment treatment direction PD1 for initially aligning the liquid crystal molecules of the liquid crystal layer LQ. The first alignment treatment direction PD1, in which the first alignment film AL1 initially aligns the liquid crystal molecules, is substantially parallel to the first direction X.

Examples of dimensions are described. The length of the pixel PX in the second direction Y is 50 µm to 60 µm. The length of the pixel PX in the first direction X is 150 µm to 180 µm. The width of each of the gate line G and storage capacitance line C in the second direction Y is 5 µm. The width of the source line S in the first direction X is 3 µm. In the meantime, the gate line G and storage capacitance line C are formed in the same layer and need to be electrically insulated, and therefore a margin of, e.g. 10 µm is secured therebetween. In addition, the source line S and source electrode WS, and the drain electrode WD are formed in the same layer and need to be electrically insulated, and therefore a margin of, e.g. 10 μm is secured therebetween.

Figure 3:
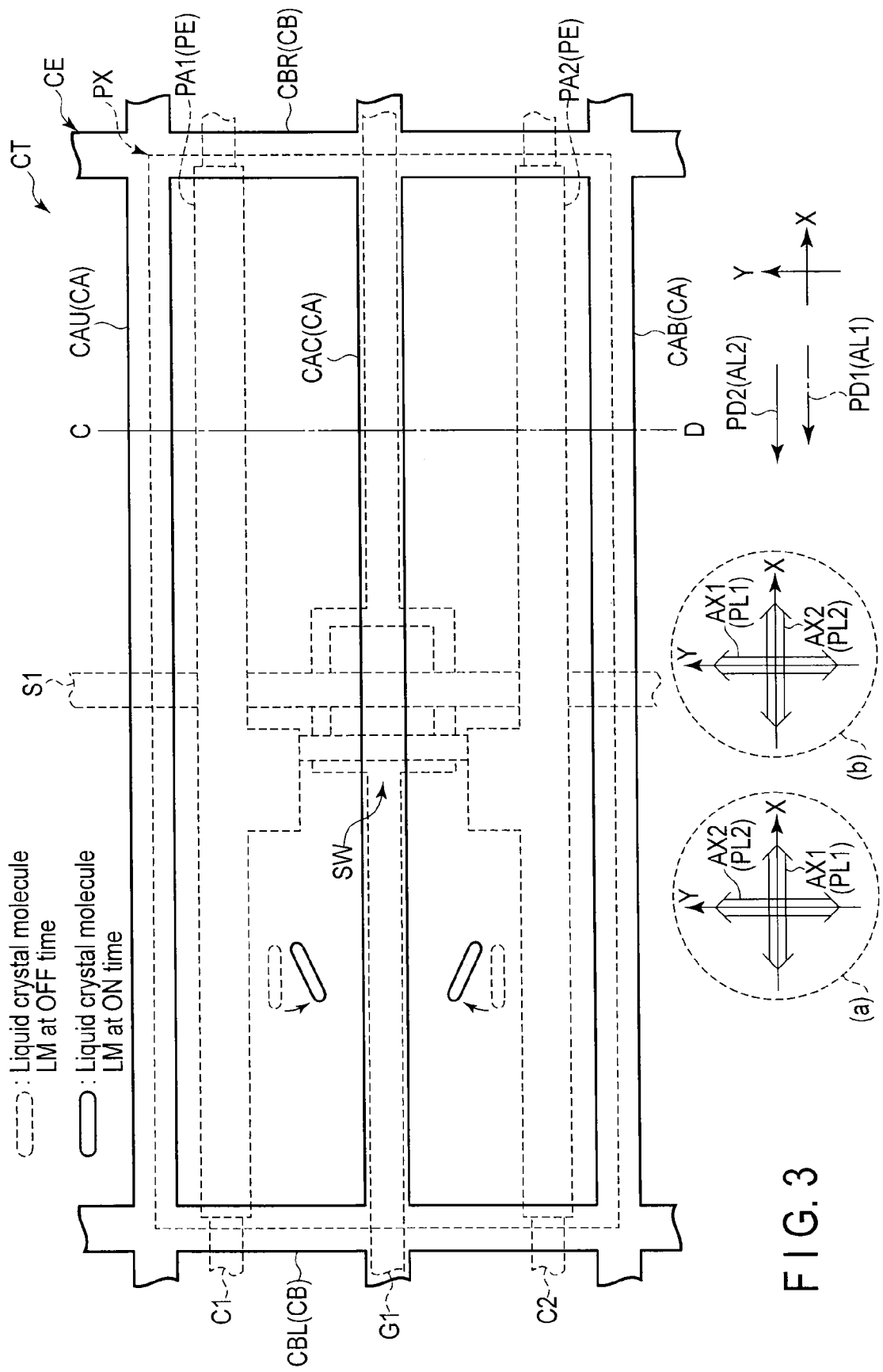
FIG. 3 is a plan view which schematically shows a structure example of a pixel in a counter-substrate shown in FIG. 1.

FIG. 3 is a plan view which schematically shows a structure example of one pixel PX in the counter-substrate CT shown in FIG. 1. FIG. 3 shows a plan view in the X-Y plane. FIG. 3 shows only structural parts that are necessary for the description, and the gate line G, storage capacitance lines C, source line S, switching element SW and pixel electrode PE, which are provided on the array substrate, are indicated by broken lines.

The common electrode CE includes a main common electrode CA on the counter-substrate CT. In the example illustrated, the common electrode CE further includes a sub-common electrode CB on the counter-substrate CT. The sub-common electrode CB, however, may be omitted.

In the X-Y plane, the main common electrode CA is located on both sides of the main pixel electrode PA1 of the pixel electrode PE and on both sides of the main pixel electrode PA2, and linearly extends in the first direction X. Alternatively, the main common electrode CA is located between the main pixel electrode PA1 and main pixel electrode PA2, at an upper side end portion of the pixel PX and at a lower side end portion of the pixel PX, respectively, and extends in the first direction X. The main common electrode CA is formed in a strip shape with a substantially uniform width in the second direction Y.

In the example illustrated, three main common electrodes CA are arranged in parallel at intervals in the second direction Y. Specifically, in each pixel, three main common electrodes CA are arranged with equal pitches in the second direction Y. In the pixel PX, a main common electrode CAU is disposed at an upper side end portion, a main common electrode CAB is disposed at a lower side end portion, and a main common electrode CAC is disposed at a central portion of the pixel. Strictly speaking, the main common electrode CAU is disposed to extend over a boundary between the pixel PX and a pixel neighboring on the upper side, and the main common electrode CAB is disposed to extend over a boundary between the pixel PX and a pixel neighboring on the lower side. Specifically, the length of the pixel PX in the second direction Y corresponds to the pitch in the second direction Y between the main common electrode CAU and main common electrode CAB. The main common electrode CAC is located between the main pixel electrode PA1 and main pixel electrode PA2, or above the gate line G1.

The main common electrode CAU and main common electrode CAC are located on both sides of the main pixel electrode PA1 and storage capacitance line C1. Similarly, the main common electrode CAC and main common electrode CAB are located on both sides of the main pixel electrode PA2 and storage capacitance line C2. In other words, one main common electrode CAC disposed at the central portion of the pixel is located at a substantially middle point between the main pixel electrode PA1 and main pixel electrode PA2. Specifically, in the example, illustrated, in the X-Y plane, the main common electrode CAB, main pixel electrode PA2, main common electrode CAC, main pixel electrode PA1 and main common electrode CAU are arranged in the named order in the second direction Y. In the meantime, the inter-electrode distance in the second direction Y between the main pixel electrode PA1 and main common electrode CAC is substantially equal to the inter-electrode distance in the second direction Y between the main common electrode CAC and main pixel electrode PA2. In addition, the inter-electrode distance in the second direction Y between the main common electrode CAU and main pixel electrode PA1 is substantially equal to the inter-electrode distance in the second direction Y between the main pixel electrode PA2 and main common electrode CAB.

The sub-common electrode CB linearly extends, in the X-Y plane, in the second direction Y on both sides of the pixel electrode PE. The sub-common electrode CB is formed in a strip shape with a substantially uniform width in the first direction X. In addition, the sub-common electrode CB is formed integral or continuous with the main common electrode CA, and is electrically connected to the main common electrode CA. Specifically, in the counter-substrate CT, the common electrode CE is formed in a grid shape.

In the example illustrated, two sub-common electrodes CB are arranged in parallel with a distance in the first direction X, and are disposed at both left and right end portions of the pixel PX. Specifically, in each pixel, two sub-common electrodes CB are disposed. In the pixel PX illustrated, a sub-common electrode CBL is disposed at a left side end portion, and a sub-common electrode CBR is disposed at a right side end portion. Strictly speaking, the sub-common electrode CBL is disposed to extend over a boundary between the pixel PX and a pixel neighboring on the left side, and the sub-common electrode CBR is disposed to extend over a boundary between the pixel PX and a pixel neighboring on the right side. Specifically, the length of the pixel PX in the first direction X corresponds to the pitch in the first direction X between the sub-common electrode CBL and sub-common electrode CBR.

In the counter-substrate CT, the common electrode CE is covered with a second alignment film AL2. The second alignment film AL2 is subjected to alignment treatment (e.g. rubbing treatment or optical alignment treatment) in a second alignment treatment direction PD2 for initially aligning the liquid crystal molecules of the liquid crystal layer LQ. The second alignment treatment direction PD2, in which the second alignment film AL2 initially aligns the liquid crystal molecules, is parallel to the first alignment treatment direction PD1, and is identical or opposite to the first alignment treatment direction PD1. In the example illustrated, the second alignment treatment direction PD2 is parallel to the first direction X, and is parallel and identical to the first alignment treatment direction PD1 in the X-Y plane.

Figure 4:
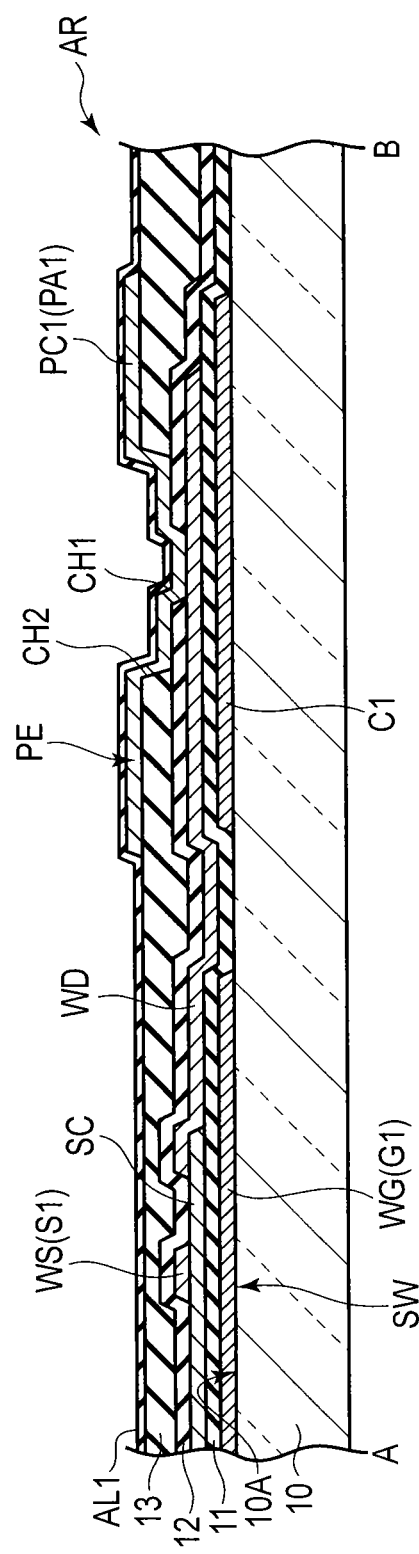
FIG. 4 is a schematic cross-sectional view, taken along line A-B in FIG. 2, showing a cross-sectional structure of the array substrate shown in FIG. 2.

FIG. 4 is a schematic cross-sectional view, taken along line A-B in FIG. 2, showing a cross-sectional structure of the array substrate AR shown in FIG. 2.

The array substrate AR is formed by using a first insulative substrate 10 having light transmissivity. The array substrate AR includes, on the first insulative substrate 10, a switching element SW, a storage capacitance line C1, a pixel electrode PE, a first insulation film 11, a second insulation film 12, a third insulation film 13, and a first alignment film AL1.

A gate electrode WG of the switching element SW is a part of the gate line G1, and is formed on an inner surface 10A of the first insulative substrate 10. The storage capacitance line C1 and storage capacitance line C2 (not shown) are spaced apart from the gate electrode WG, are formed on the inner surface 10A of the first insulative substrate 10, and are covered with the first insulation film 11. The gate electrode WG, gate line G1 and storage capacitance line C1 are formed of the same material (e.g. the above-described opaque wiring material). In addition, the gate electrode WG, gate line G1 and storage capacitance line C1 can be formed at a time by using the same material.

A semiconductor layer SC of the switching element SW is formed on the first insulation film 11 and is located above the gate electrode WG. A source electrode WS of the switching element SW is a part of the source line S1, is formed on the first insulation film 11, and is put in contact with the semiconductor layer SC. A drain electrode WD is spaced apart from the source electrode WS and source line S1, is formed on the first insulation film 11 and is put in contact with the semiconductor layer SC. In addition, the drain electrode WD extends over the storage capacitance line C1. Specifically, the drain electrode WD is opposed to the storage capacitance line C1 via the first insulation film 11. The source electrode WS and drain electrode WD are formed of the same material (e.g. the above-described opaque wiring material). In addition, the source electrode WS and drain electrode WD can be formed at a time by using the same material. Although not shown, the drain electrode WD also extends over the storage capacitance line C2 over the first insulation film 11.

The semiconductor layer SC, source electrode WS and drain electrode WD, together with the source line S1, are covered with the second insulation film 12. A contact hole CH1, which penetrates to the drain electrode WD, is formed in the second insulation film 12. Although not shown, a contact hole CH3 is also formed in the second insulation film 12.

The third insulation film 13 is formed on the second insulation film 12. The third insulation film 13 is formed of, for example, an organic material, and the surface thereof is planarized. A contact hole CH2 is formed in the third insulation film 13. The contact hole CH2 has a greater size than the contact hole CH1, penetrates to the drain electrode WD in the contact hole CH1, and penetrates to the second insulation film 12 at the periphery of the contact hole CH1. Although not shown, a contact hole CH4 is also formed in the third insulation film 13.

The contact portion PC1 of the main pixel electrode PA1 that is the pixel electrode PE and the contact portion PC2 of the main pixel electrode PA2 (not shown) are formed on the third insulation film 13. Specifically, the second insulation film 12 and third insulation film 13 correspond to interlayer insulation films lying between the source line, source electrode and drain electrode, on the one hand, and the pixel electrode, on the other hand. The contact portion PC1 is put in contact with the drain electrode WD via the contact hole CH1 and contact hole CH2.

The first alignment film AL1 covers the pixel electrode PE, and is also disposed over the third insulation film 13. The first alignment film AL1 is formed of a material which exhibits horizontal alignment properties.

FIG. 5A is a schematic cross-sectional view, taken along line C-D in FIG. 3, showing a cross-sectional structure of the liquid crystal display panel LPN shown in FIG. 3.

A backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

In the array substrate AR, the gate line G1, storage capacitance line C1 and storage capacitance line C2 are formed on the inner surface 10A of the first insulative substrate 10, that is, on the side thereof facing the counter-substrate CT, and are covered with the first insulation film 11. The main pixel electrode PA1 and main pixel electrode PA2 of the pixel electrode PE are formed on the third insulation film 13. The main pixel electrode PA1 is opposed to the storage capacitance line C1. Specifically, the main pixel electrode PA1 is disposed at a position overlapping the storage capacitance line C1 via the first insulation film 11, second insulation film 12 and third insulation film 13. The main pixel electrode PA2 is opposed to the storage capacitance line C2. Specifically, the main pixel electrode PA2 is disposed at a position overlapping the storage capacitance line C2 via the first insulation film 11, second insulation film 12 and third insulation film 13. The pixel electrode PE is covered with the first alignment film AL1. The first alignment film AL1 is disposed on that surface of the array substrate AR, which is opposed to the counter-substrate CT, and the first alignment film AL1 extends over substantially the entirety of the active area ACT.

The counter-substrate CT is formed by using a second insulative substrate 20 having light transmissivity. The counter-substrate CT includes, on the inside of the second insulative substrate 20, that is, on the side thereof facing the array substrate AR, a color filter CF, an overcoat layer OC, a common electrode CE, and a second alignment film AL2. In the meantime, a black matrix, which partitions the pixels PX, may be disposed on the inner surface 20A of the second insulative substrate 20, which is opposed to the array substrate AR.

The color filter CF is disposed in association with each pixel PX. Specifically, the color filter CF is disposed on the inner surface 20A of the second insulative substrate 20. Color filters CF, which are disposed in the pixels PX neighboring in the second direction Y, have mutually different colors. For example, the color filters CF are formed of resin materials which are colored in three primary colors of red, blue and green. A red color filter is disposed in association with a red pixel. A blue color filter is disposed in association with a blue pixel. A green color filter is disposed in association with a green pixel.

The overcoat layer OC covers the color filters CF. The overcoat layer OC reduces the effect of asperities on the surfaces of the color filters CF. The overcoat layer OC is formed of a transparent resin material.

The main common electrode CAU, main common electrode CAC and main common electrode CAB of the common electrode CE, and the sub-common electrode CB (not shown) are formed on that side of the overcoat layer OC, which is opposed to the array substrate AR. Each of the main common electrode CAU and main common electrode CAB is disposed at a position overlapping a boundary between neighboring color filters. The main common electrode CAC is located between the main common electrode CAU and main common electrode CAB, or between the main pixel electrode PA1 and main pixel electrode PA2, or above the gate line G1.

The regions between the pixel electrode PE and the common electrode CE, namely a region between the main common electrode CAU and main pixel electrode PA1, a region between the main common electrode CAC and main pixel electrode PA1, a region between the main common electrode CAC and main pixel electrode PA2, and a region between the main common electrode CAB and main pixel electrode PA2, correspond to transmissive regions through which light can pass.

The second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE and overcoat layer OC. The second alignment film AL2 is formed of a material which exhibits horizontal alignment properties.

The above-described array substrate AR and counter-substrate CT are disposed such that their first alignment film AL1 and second alignment film AL2 are opposed to each other. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap, for example, a cell gap of 2 to 7 μm, is created. The array substrate AR and counter-substrate CT are attached by a sealant on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of a liquid crystal material having a positive (positive-type) dielectric constant anisotropy. In the meantime, the distance in the second direction Y between the main pixel electrode PA1 and each of the main common electrode CAU and main common electrode CAC, as well as the distance in the second direction Y between the main pixel electrode PA2 and each of the main common electrode CAC and main common electrode CAB, is greater than the thickness of the liquid crystal layer LQ and is double or more the thickness of the liquid crystal layer LQ.

A first optical element OD1 is attached by, e.g. an adhesive, to an outer surface of the array substrate AR, that is, an outer surface 10B of the first insulative substrate 10. The first optical element OD1 is located on that side of the liquid crystal display panel LPN, which is opposed to the backlight 4, and controls the polarization state of incident light which enters the liquid crystal display panel LPN from the backlight 4. The first optical element OD1 includes a first polarizer PL1 having a first polarization axis AX1 (or a first absorption axis). In the meantime, another optical element, such as a retardation plate, may be disposed between the first polarizer PL1 and the first insulative substrate 10.

A second optical element OD2 is attached by, e.g. an adhesive, to an outer surface of the counter-substrate CT, that is, an outer surface 20B of the second insulative substrate 20. The second optical element OD2 is located on the display surface side of the liquid crystal display panel LPN, and controls the polarization state of emission light emerging from the liquid crystal display panel LPN. The second optical element OD2 includes a second polarizer PL2 having a second polarization axis AX2 (or a second absorption axis). In the meantime, another optical element, such as a retardation plate, may be disposed between the second polarizer PL2 and the second insulative substrate 20.

The first polarization axis AX1 of the first polarizer PL1 and the second polarization axis AX2 of the second polarizer PL2 have a substantially orthogonal positional relationship (crossed Nicols). In this case, one of the polarizers is disposed such that the polarization axis thereof is substantially parallel or substantially perpendicular to the direction of extension of the main pixel electrode PA or main common electrode CA. Specifically, when the direction of extension of the main pixel electrode PA or main common electrode CA is the first direction X, the absorption axis of one of the polarizers is substantially parallel to the first direction X, or is substantially parallel to the second direction Y.

Alternatively, one of the polarizers is disposed such that the polarization axis thereof is substantially parallel or substantially perpendicular to the direction of initial alignment of liquid crystal molecules, that is, the first alignment treatment direction PD1 or second alignment treatment direction PD2. When the initial alignment direction is parallel to the first direction X, the polarization axis of one polarizer is substantially parallel to the first direction X or is substantially parallel to the second direction Y.

In an example shown in part (a) of FIG. 3, the second polarizer PL2 is disposed such that the second polarization axis AX2 thereof is perpendicular to the first direction X, and the first polarizer PL1 is disposed such that the first polarization axis AX1 thereof is parallel to the first direction X. In addition, in an example shown in part (b) of FIG. 3, the first polarizer PL1 is disposed such that the first polarization axis AX1 thereof is perpendicular to the first direction X, and the second polarizer PL2 is disposed such that the second polarization axis AX2 thereof is parallel to the first direction X.

Next, the operation of the liquid crystal display panel LPN having the above-described structure is described with reference to FIG. 2 to FIG. 5A.

Specifically, in a state in which no voltage is applied to the liquid crystal layer LQ, that is, in a state (OFF time) in which no electric field is produced between the pixel electrode PE and common electrode CE, the liquid crystal molecule LM of the liquid crystal layer LQ is aligned such that the major axis thereof is positioned in the first alignment treatment direction PD1 of the first alignment film AL1 and the second alignment treatment direction PD2 of the second alignment film AL2. This OFF time corresponds to the initial alignment state, and the alignment direction of the liquid crystal molecule LM at the OFF time corresponds to the initial alignment direction.

Strictly speaking, the liquid crystal molecule LM is not always aligned in parallel to the X-Y plane, and, in many cases, the liquid crystal molecule LM is pre-tilted. Thus, the initial alignment direction of the liquid crystal molecule LM corresponds to a direction in which the major axis of the liquid crystal molecule LM at the OFF time is orthogonally projected onto the X-Y plane. In the description below, for the purpose of simplicity, it is assumed that the liquid crystal molecule LM is aligned in parallel to the X-Y plane, and the liquid crystal molecule LM rotates in a plane parallel to the X-Y plane. In this example, each of the first alignment treatment direction PD1 and the second alignment treatment direction PD2 is substantially parallel to the first direction X. At the OFF time, the liquid crystal molecule LM is initially aligned such that the major axis thereof is substantially parallel to the first direction X, as indicated by a broken line in FIG. 3.

When the first alignment treatment direction PD1 and the second alignment treatment direction PD2 are parallel and identical to each other, as in the example illustrated, the liquid crystal molecules LM are substantially horizontally aligned (the pre-tilt angle is substantially zero) in the middle part of the liquid crystal layer LQ in the cross section of the liquid crystal layer LQ, and the liquid crystal molecules LM are aligned with such pre-tilt angles that the liquid crystal molecules LM become symmetric in the vicinity of the first alignment film AL1 and in the vicinity of the second alignment film AL2, with respect to the middle part as the boundary (splay alignment). In the state in which the liquid crystal molecules LM are splay-aligned, optical compensation can be made by the liquid crystal molecules LM in the vicinity of the first alignment film AL1 and the liquid crystal molecules LM in the vicinity of the second alignment film AL2, even in a direction inclined to the normal direction of the substrate. Therefore, when the first alignment treatment direction PD1 and the second alignment treatment direction PD2 are parallel and identical to each other, light leakage is small in the case of black display, a high contrast ratio can be realized, and the display quality can be improved. In the meantime, when the first alignment treatment direction PD1 and the second alignment treatment direction PD2 are parallel and opposite to each other, the liquid crystal molecules LM are aligned with substantially equal pre-tilt angles, in the cross section of the liquid crystal layer LQ, in the vicinity of the first alignment film AL1, in the vicinity of the second alignment film AL2, and in the middle part of the liquid crystal layer LQ (homogeneous alignment).

Part of light from the backlight 4 passes through the first polarizer PL1, and enters the liquid crystal display panel LPN. The light that has entered the liquid crystal display panel LPN is linearly polarized light which is perpendicular to the first polarization axis AX1 of the first polarizer PL1. The polarization state of such linearly polarized light hardly varies at the OFF time. Thus, the linearly polarized light, which has passed through the liquid crystal display panel LPN, is absorbed by the second polarizer PL2 that is in the positional relationship of crossed Nicols in relation to the first polarizer PL1 (black display).

On the other hand, in a state in which a voltage is applied to the liquid crystal layer LQ, that is, in a state (ON time) in which an electric field is produced between the pixel electrode PE and common electrode CE, a lateral electric field (or an oblique electric field), which is substantially parallel to the substrates, is produced between the pixel electrode PE and the common electrode CE. The liquid crystal molecules LM are affected by the electric field, and the major axes thereof rotate within a plane which is substantially parallel to the X-Y plane, as indicated by solid lines in the Figure.

In the example shown in FIG. 3, in the pixel PX, the liquid crystal molecule LM in a region between the main pixel electrode PA1 and main common electrode CAC mainly rotates counterclockwise relative to the first direction X, and is aligned in a lower left direction in the Figure. In addition, the liquid crystal molecule LM in a region between the main pixel electrode PA2 and main common electrode CAC mainly rotates clockwise relative to the first direction X, and is aligned in an upper left direction in the Figure.

As has been described above, in the state in which the electric field is produced between the pixel electrode PE and common electrode CE in each pixel PX, the liquid crystal molecules LM are aligned in a plurality of directions, with boundaries at positions overlapping the pixel electrode PE or at positions overlapping the common electrode CE, and domains are formed in the respective alignment directions. Specifically, a plurality of domains are formed in one pixel PX.

At such ON time, linearly polarized light, which is perpendicular to the first polarization axis AX1 of the first polarizer PL1, enters the liquid crystal display panel LPN. The polarization state of such linearly polarized light varies depending on the alignment state of the liquid crystal molecules LM when the light passes through the liquid crystal layer LQ. For example, when linearly polarized light, which is parallel to the first direction X, has entered the liquid crystal display panel LPN, the light is affected, while passing through the liquid crystal layer LQ, by a retardation of $\lambda/2$ by the liquid crystal molecules LM which are aligned in a 45°-225° azimuth direction or a 135°-315° azimuth direction relative to the first direction X ($\lambda$ is a wavelength of light passing through the liquid crystal layer LQ). Thereby, the polarization state of the light, which has passed through the liquid crystal layer LQ, becomes linear polarization which is parallel to the second direction Y. Thus, at the ON time, at least part of the light emerging from the liquid crystal layer LQ passes through the second polarizer PL2 (white display). However, at a position overlapping the pixel electrode or common electrode, since the liquid crystal molecules maintain the initial alignment state, black display is effected as in the case of the OFF time.

According to the present embodiment, the laterally elongated pixel structure is adopted, wherein the length in the first direction X, which is the direction of extension of the gate line and storage capacitance line, is greater than the length in the second direction Y, which is the direction of extension of the source line. Thereby, compared to a vertically elongated pixel structure wherein the length in the second direction Y is greater than the length in the first direction X, the total number of signal lines, such as gate lines, storage capacitance lines and source lines, can be reduced, despite the total number of pixels in the active area being the same. Thus, the number of terminals of signal lines can be reduced, the scale of drivers for supplying signals to these signal lines can be reduced, and the number of driving IC chips, which are to be mounted in the liquid crystal display panel LPN, can be reduced. Therefore, cost reduction can be realized.

In addition, according to the embodiment, the main pixel electrode PA of the pixel electrode PE extends in the first direction X of the pixel PX, and is electrically connected to the drain electrode WD of the switching element SW at a substantially middle position of the pixel PX in the first direction X. Thus, in such specifications that the pixel size is increased, in particular, in such pixel-pitch specifications that the length of the pixel PX in the first direction X is increased, it is possible to reduce a difference in resistance between the vicinity of a contact with the drain electrode WD in the pixel electrode PE and the end of the main pixel electrode, and to suppress degradation in display quality due to a difference in electric field intensity in the pixel at the ON time.

According to the embodiment, one gate line G is located at a central part of the pixel PX, and two storage capacitance lines C per pixel PX are located on both sides of the gate line G and form a capacitance between the storage capacitance lines C and the pixel electrode PE, which capacitance is necessary for image display in each pixel PX. Thus, there is no need to arrange wiring of storage capacitance lines C within the pixel PX, and a space necessary for forming a capacitance can be secured. In addition, since the gate line G is located immediately below the main common electrode CAC which is a non-transmissive region in the pixel PX, even if the gate line G is located at the central part of the pixel, the area of the transmissive region does not decrease.

According to the present embodiment, a high transmittance can be obtained in the inter-electrode gap between the pixel electrode PE and the common electrode CE. In addition, a transmittance per pixel can be increased by increasing the inter-electrode distance between the pixel electrode PE and the common electrode CE. Besides, as regards product specifications in which the pixel pitch is different, for example, it is possible to make use of a peak condition of a transmittance distribution by varying the inter-electrode distance between the pixel electrode PE and common electrode CE. Specifically, in the display mode of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch.

According to the present embodiment, in the region overlapping the common electrode CE, the transmittance is sufficiently lowered. The reason for this is that the electric field does not leak to the outside of the pixel from the positions of the common electrode CE, and an undesired lateral electric field does not occur between pixels which neighbor each other, and therefore the liquid crystal molecules LM in the region overlapping the common electrode CE keep the initial alignment state, like the case of the OFF time (or black display time). Accordingly, even when the colors of the color filters CF are different between pixels which neighbor each other, the occurrence of color mixture can be suppressed, and the decrease in color reproducibility or the decrease in contrast ratio can be suppressed. In addition, when misalignment has occurred between the array substrate AR and the counter-substrate CT, a difference in inter-electrode distance between the pixel electrode PE and the common electrodes CE on both sides of the pixel electrode PE occurs commonly in all pixels PX. Thus, the electric field distribution does not differ between the pixels PX, and the influence on the display of images can be reduced.

In addition, when one pixel PX is viewed on the X-Y plane, the pixel electrode PE is disposed on the array substrate AR within the inside of the common electrode CE that is disposed on the counter-substrate CT. In other words, in one pixel PX, the pixel electrode PE is surrounded by the main common electrode CAU, main common electrode CAB, sub-common electrode CBR and sub-common electrode CBL of the common electrode CE. By this arrangement, electric force lines have their starting point and end point within one pixel, and the electric force lines in this pixel do not leak to a neighboring pixel. Thus, for example, electric fields, which are applied to the liquid crystal layer LQ, do not affect each other between pixels PX which neighbor in the first direction X and second direction Y. Therefore, the liquid crystal molecules LM in the pixel do not move due to the effect of the electric field from the neighboring pixel, and the degradation in display quality can be suppressed.

According to the present embodiment, a plurality of domains can be formed in one pixel. Thus, the viewing angle can be optically compensated in plural directions, and the viewing angle can be increased. In the example illustrated in FIG. 3, at least two domains can be formed within one pixel and the two domains have substantially equal areas. Therefore, further viewing angle compensation can be made.

The above-described example is directed to the case where the initial alignment direction of liquid crystal molecules LM is parallel to the first direction X. However, the initial alignment direction of liquid crystal molecules LM may be an oblique direction which obliquely crosses the first direction X and second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy.

In the present embodiment, the structure of the pixel PX is not limited to the above-described example.

Figure 5B:
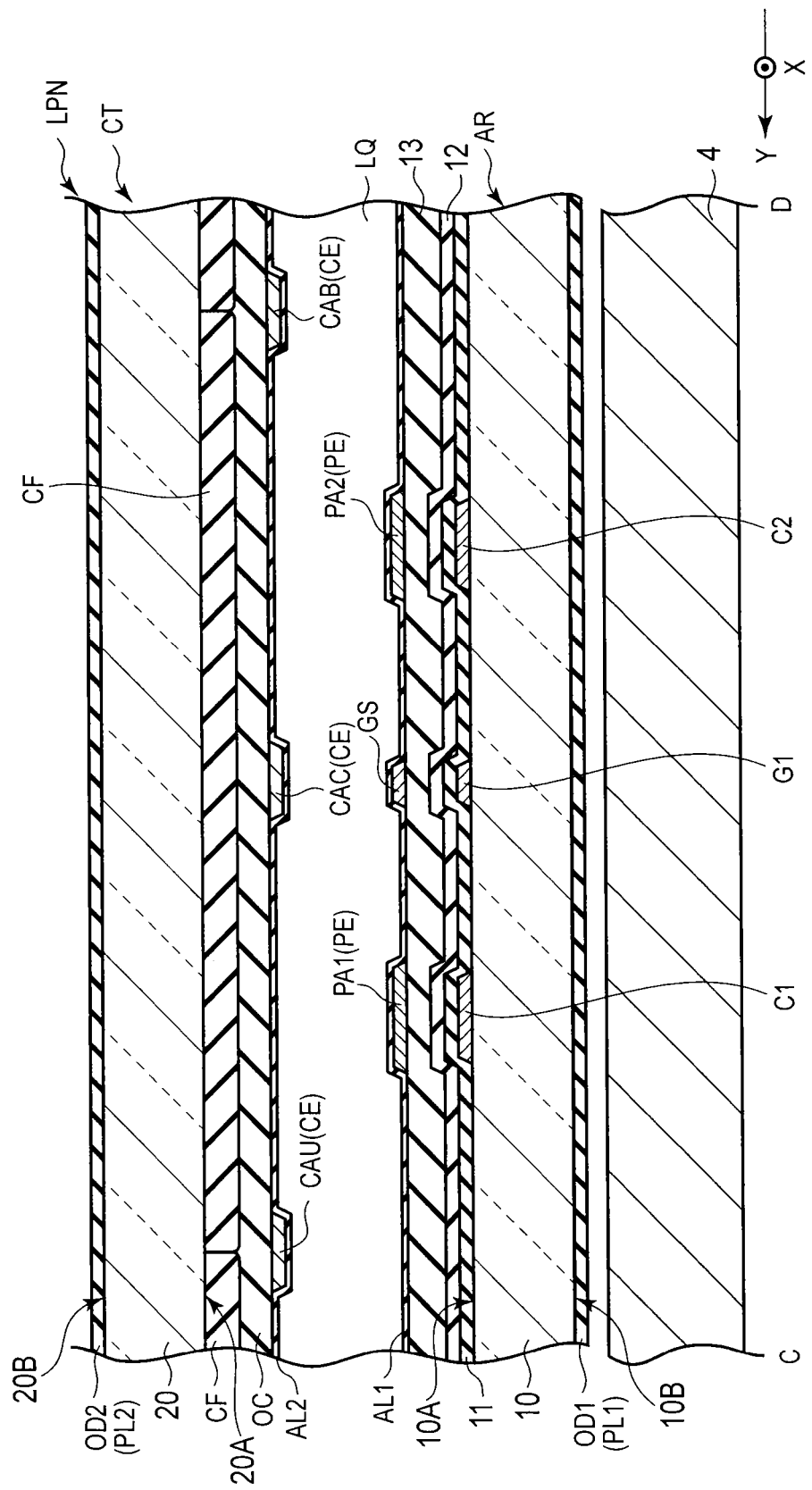
FIG. 5B is a schematic cross-sectional view, taken along line C-D in FIG. 3, showing another cross-sectional structure of the liquid crystal display panel shown in FIG. 3.

FIG. 5B is a schematic cross-sectional view, taken along line C-D in FIG. 3, showing another cross-sectional structure of the liquid crystal display panel shown in FIG. 3.

The structure example illustrated in FIG. 5B differs from the structure example shown in FIG. 5A in that the array substrate AR further includes a gate shield electrode GS. The gate shield electrode GS is opposed to the gate line G1. The gate shield electrode GS linearly extends in the first direction X, and is formed in a strip shape. The gate shield electrode GS is electrically connected to the common electrode CE, and has the same potential as the common electrode CE. Since the gate shield electrode GS is formed on an upper surface of the third insulation film 13, that is, in the same layer as the pixel electrode PE, the gate shield electrode GS can be formed of the same material (e.g. ITO) as the pixel electrode PE.

According to this structure example, since the gate shield electrode GS is opposed to the gate line G1, an undesired electric field from the gate line G1 can be shielded. It is thus possible to suppress application of an undesired bias from the gate line G1 to the liquid crystal layer LQ, and to suppress the occurrence of a display defect such as burn-in, and the occurrence of light leakage due to an alignment defect of liquid crystal molecules.

Figure 6:
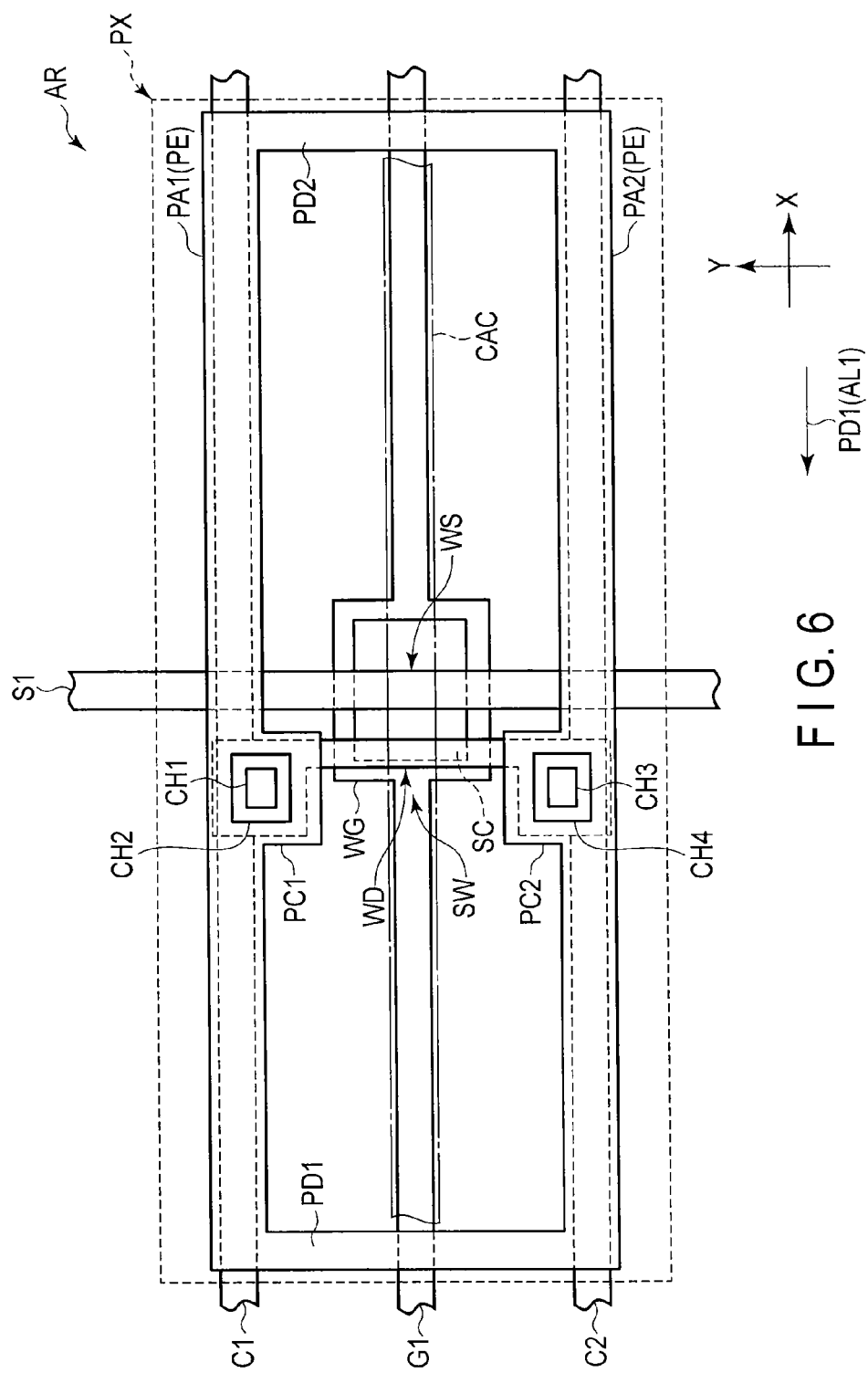
FIG. 6 is a plan view which schematically shows another structure example of the pixel at a time when the array substrate shown in FIG. 1 is viewed from the counter-substrate side.

FIG. 6 is a plan view which schematically shows another structure example of the pixel PX at a time when the array substrate AR shown in FIG. 1 is viewed from the counter-substrate side.

The structure example illustrated in FIG. 6 differs from the structure example shown in FIG. 2 in that the pixel electrode PE is formed in a loop shape. Specifically, the pixel electrode PE includes, in addition to the main pixel electrode PA1 and main pixel electrode PA2 each extending in the first direction X, a connection portion PD1 which is connected to one end portion of the main pixel electrode PA1 and one end portion of the main pixel electrode PA2 and extends in the second direction Y, and a connection portion PD2 which is connected to the other end portion of the main pixel electrode PA1 and the other end portion of the main pixel electrode PA2 and extends in the second direction Y. The connection portion PD1 is located near the left side end portion of the pixel PX. The connection portion PD2 is located near the right side end portion of the pixel PX. Each of the connection portion PD1 and connection portion PD2 linearly extends in the second direction Y and is formed in a strip shape with a substantially uniform width in the first direction X. Specifically, the pixel electrode PE shown in FIG. 6 has a rectangular frame shape.

The array substrate AR of this structure example can be combined with the counter-substrate CT shown in FIG. 3. In this case, the main common electrode CAC is located above the gate line G1.

Also in this structure example, the same advantageous effects as in the above-described structure example can be obtained. In addition, according to this structure example, since the pixel electrode PE is formed in a loop shape, redundancy can be improved with respect to breakage of the pixel electrode PE. Specifically, even if breakage occurs in a part of the pixel electrode PE, a pixel potential can be supplied to each of the main pixel electrode PA1 and main pixel electrode PA2 via another path. Therefore, even if the electrode width becomes very small in order to meet a demand for higher fineness, it is possible to suppress degradation in display quality, such as a display defect due to line breakage in the pixel PX.

Figure 7:
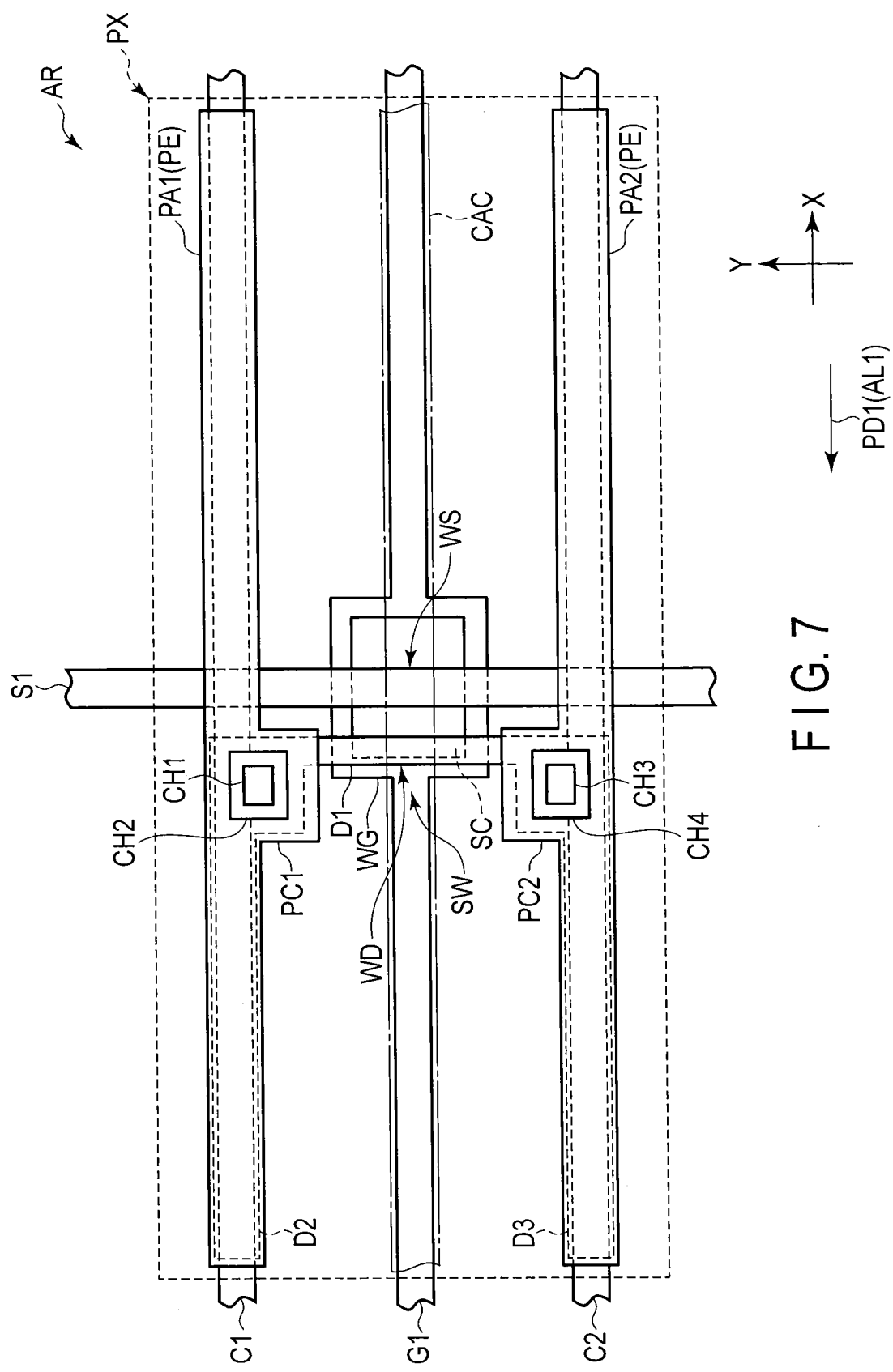
FIG. 7 is a plan view which schematically shows another structure example of the pixel at a time when the array substrate shown in FIG. 1 is viewed from the counter-substrate side.

FIG. 7 is a plan view which schematically shows another structure example of the pixel PX at a time when the array substrate AR shown in FIG. 1 is viewed from the counter-substrate side.

The structure example illustrated in FIG. 7 differs from the structure example shown in FIG. 2 in that the drain electrode WD can form a capacitance between itself and the storage capacitance line C1 and storage capacitance line C2. Specifically, the drain electrode WD includes a first electrode portion D1 which is put in contact with one end portion of the semiconductor layer SC, a second electrode portion D2 which is continuous with one end portion of the first electrode portion D1, and a third electrode portion D3 which is continuous with the other end portion of the first electrode portion D1. The first electrode portion D1, second electrode portion D2 and third electrode portion D3 are formed integral or continuous, and are electrically connected to each other.

The first electrode portion D1 linearly extends in the second direction Y. The first electrode portion D1 is formed in a strip shape with a substantially uniform width in the first direction X. In the first electrode portion D1, an area between one end portion and the other end portion thereof is put in contact with the semiconductor layer SC. The second electrode portion D2 and third electrode portion D3 linearly extend in the first direction X from the first electrode portion D1 to a side opposite to the source line S1. In the example illustrated, each of the second electrode portion D2 and third electrode portion D3 extends in the first direction X from the position of connection to the first electrode portion D1 toward the left side end portion of the pixel PX. Each of the second electrode portion D2 and third electrode portion D3 is formed in a strip shape with a substantially uniform width in the second direction Y.

In this drain electrode WD, the second electrode portion D2 is opposed to the storage capacitance line C1. Specifically, the storage capacitance line C1 linearly extends immediately below the second electrode portion D2 in the first direction X. The third electrode portion D3 is opposed to the storage capacitance line C2. Specifically, the storage capacitance line C2 linearly extends immediately below the third electrode portion D3 in the first direction X. Although not described in detail, only the first insulation film 11 lies between the second electrode portion D2 and storage capacitance line C1 and between the third electrode portion D3 and storage capacitance line C2. In this drain electrode WD, a capacitance which is necessary for image display in the pixel PX can be formed between the second electrode portion D2 and storage capacitance line C1 and between the third electrode portion D3 and storage capacitance line C2.

The array substrate AR of this structure example can be combined with the counter-substrate CT shown in FIG. 3. In this case, the main common electrode CAC is located above the gate line G1.

Also in this structure example, the same advantageous effects as in the above-described structure example can be obtained. In addition, according to this structure example, a capacitance can be formed between the storage capacitance line C1 and storage capacitance line C2, on the one hand, and the drain electrode WD, on the other hand, which are opposed via the first insulation film 11. Specifically, the gap between the storage capacitance line C1 and storage capacitance line C2, on the one hand, and the drain electrode WD, on the other hand, corresponds to the thickness of the first insulation film 11. Therefore, compared to the case of forming a capacitance in the state in which a plurality of insulation films are interposed between the storage capacitance line C1 and storage capacitance line C2 and the drain electrode WD, a greater capacitance can efficiently be formed with a smaller area.

In the meantime, the above-described drain electrode WD may be formed in a loop shape by disposing an electrode portion, which connects end portions of the second electrode portion D2 and third electrode portion D3, in the vicinity of the left side end portion of the pixel PX. In this case, redundancy can be improved with respect to breakage of the drain electrode WD.

FIG. 8 is a plan view which schematically shows another structure example of the pixel PX at a time when the array substrate AR shown in FIG. 1 is viewed from the counter-substrate side.

The structure example illustrated in FIG. 8 differs from the structure example shown in FIG. 2 in that a drain electrode WD1 and a drain electrode WD2 are provided on both sides of the source line S1.

Specifically, the drain electrode WD1 and drain electrode WD2 are spaced apart from the source line S1 (or the source electrode WS that is in contact with the semiconductor layer SC), and extend in the second direction Y. The source line S1 is located between the drain electrode WD1 and drain electrode WD2 and is put in contact with a substantially central portion of the semiconductor layer SC. The drain electrode WD1 is located on the left side of the pixel PX, relative to the source line S1 or source electrode WS, is put in contact with one end portion of the semiconductor layer SC, and extends over the storage capacitance line C1 and storage capacitance line C2. The drain electrode WD2 is located on the right side of the pixel PX, relative to the source line S1 or source electrode WS, is put in contact with the other end portion of the semiconductor layer SC, and extends over the storage capacitance line C1 and storage capacitance line C2. Specifically, the drain electrode WD1, source electrode WS and drain electrode WD2 are arranged in the named order in the first direction X and are put in contact with the semiconductor layer SC.

The main pixel electrode PA1 of the pixel electrode PE is electrically connected to the drain electrode WD1 and drain electrode WD2, is located above the storage capacitance line C1, and extends in the first direction X. The main pixel electrode PA1 includes a contact portion PC1 and a contact portion PC3. The contact portion PC1 and contact portion PC3 are located on both sides of the source line S1 which extends through a substantially central part of the pixel PX. The contact portion PC1 is located above one end portion of the drain electrode WD1, and is electrically connected to the drain electrode WD1 via the contact hole CH1 and contact hole CH2 above the storage capacitance line C1. Similarly, the contact portion PC3 is located above one end portion of the drain electrode WD2, and is electrically connected to the drain electrode WD2 via two contact holes above the storage capacitance line C1.

The main pixel electrode PA2 of the pixel electrode PE is electrically connected to the drain electrode WD1 and drain electrode WD2, is located above the storage capacitance line C2, and extends in the first direction X. The main pixel electrode PA2 includes a contact portion PC2 and a contact portion PC4. The contact portion PC2 and contact portion PC4 are located on both sides of the source line S1. The contact portion PC2 is located above the other end portion of the drain electrode WD1, and is electrically connected to the drain electrode WD1 via the contact hole CH3 and contact hole CH4 above the storage capacitance line C2. Similarly, the contact portion PC4 is located above the other end portion of the drain electrode WD2, and is electrically connected to the drain electrode WD2 via two contact holes above the storage capacitance line C2.

The array substrate AR of this structure example can be combined with the counter-substrate CT shown in FIG. 3. In this case, the main common electrode CAC is located above the gate line G1.

Also in this structure example, the same advantageous effects as in the above-described structure example can be obtained. In addition, according to this structure example, one main pixel electrode PA of the pixel electrode PE is electrically connected to two drain electrodes WD at a substantially middle position of the pixel PX in the first direction X. In addition, the distance from the position of contact of the main pixel electrode PA1 with the drain electrode WD1 to one end of the main pixel electrode PA1 (i.e. the left side end of the pixel PX) is substantially equal to the distance from the position of contact of the main pixel electrode PA1 with the drain electrode WD2 to the other end of the main pixel electrode PA1 (i.e. the right side end of the pixel PX). Thus, in such specifications that the length of the pixel PX in the first direction X is increased, it is possible to reduce a difference in resistance between the vicinity of a contact with the drain electrode WD and the end of the main pixel electrode. In addition, even if such a difference in resistance occurs, the resistance values at one end and the other end of the main pixel electrode can be made substantially equal. Therefore, degradation in display quality can be suppressed.

Furthermore, according to this structure example, even if breakage occurs between one drain electrode and the main pixel electrode, an electrical connection can be secured between the other drain electrode and the main pixel electrode, and redundancy can be improved.

In the meantime, in this structure example, like the example shown in FIG. 5B, the array substrate AR may include a gate shield electrode GS which is opposed to the gate line G1.

Figure 9:
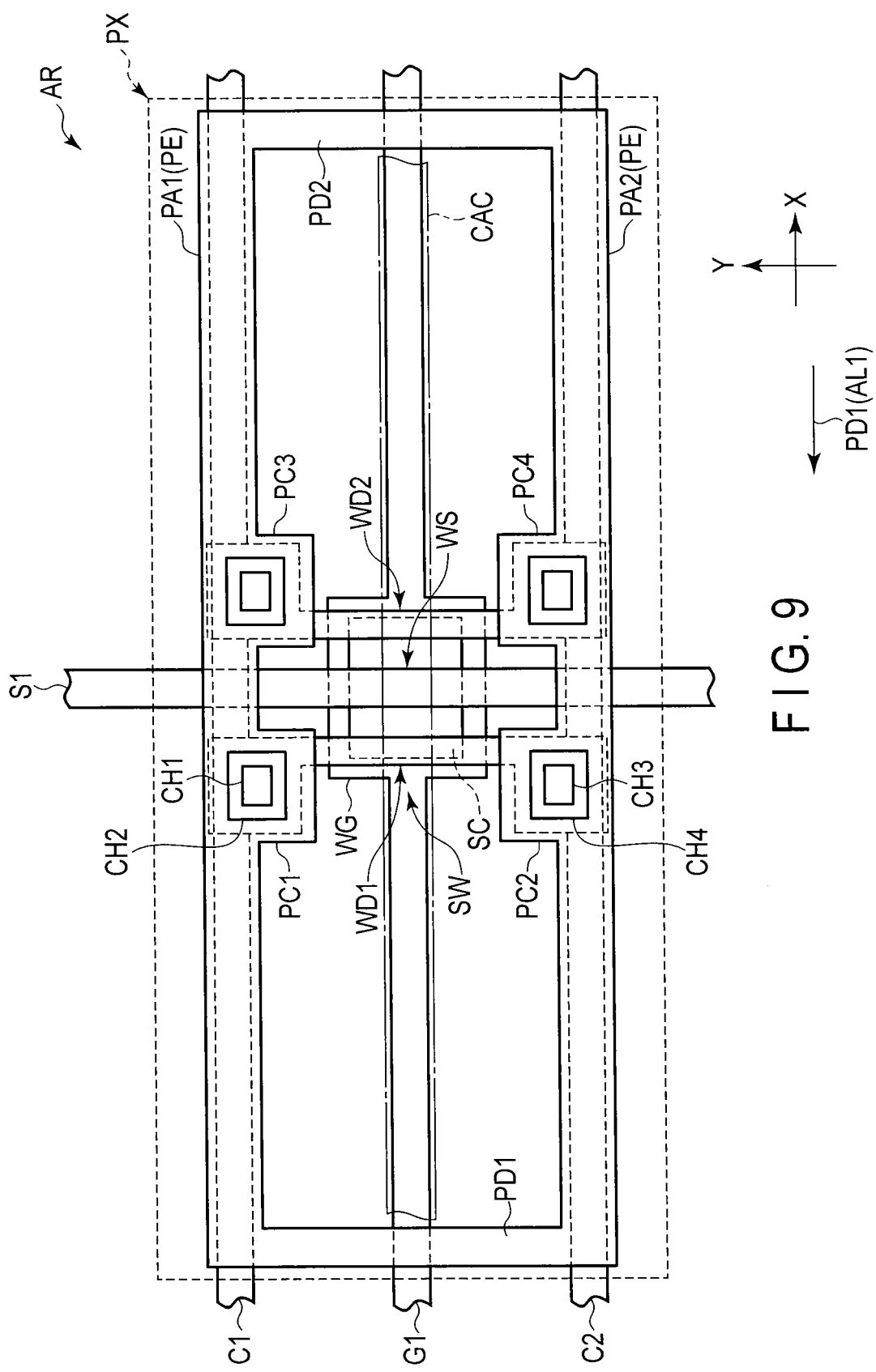
FIG. 9 is a plan view which schematically shows another structure example of the pixel at a time when the array substrate shown in FIG. 1 is viewed from the counter-substrate side.

FIG. 9 is a plan view which schematically shows another structure example of the pixel PX at a time when the array substrate AR shown in FIG. 1 is viewed from the counter-substrate side.

The structure example illustrated in FIG. 9 differs from the structure example shown in FIG. 8 in that the pixel electrode PE is formed in a loop shape. Specifically, the pixel electrode PE includes, in addition to the main pixel electrode PA1 and main pixel electrode PA2 each extending in the first direction X, a connection portion PD1 which is connected to one end portion of the main pixel electrode PA1 and one end portion of the main pixel electrode PA2 and extends in the second direction Y, and a connection portion PD2 which is connected to the other end portion of the main pixel electrode PA1 and the other end portion of the main pixel electrode PA2 and extends in the second direction Y. The pixel electrode PE shown in FIG. 9, like the example shown in FIG. 6, has a rectangular frame shape.

The array substrate AR of this structure example can be combined with the counter-substrate CT shown in FIG. 3. In this case, the main common electrode CAC is located above the gate line G1.

Also in this structure example, the same advantageous effects as in the above-described structure example can be obtained. In addition, according to this structure example, since the pixel electrode PE is formed in a loop shape, redundancy can be improved with respect to breakage of the pixel electrode PE.

FIG. 10 is a plan view which schematically shows another structure example of the pixel PX at a time when the array substrate AR shown in FIG. 1 is viewed from the counter-substrate side.

The structure example illustrated in FIG. 10 differs from the structure example shown in FIG. 8 in that the drain electrode WD1 and drain electrode WD2 can form capacitances between themselves and the storage capacitance line C1 and storage capacitance line C2.

Specifically, the drain electrode WD1 includes a first electrode portion D1 which is put in contact with the semiconductor layer SC, and a second electrode portion D2 and a third electrode portion D3 which are continuous with the first electrode portion D1. The first electrode portion D1, second electrode portion D2 and third electrode portion D3 are formed integral or continuous, and are electrically connected to each other. This drain electrode WD1 has the same structure as the example shown in FIG. 7, and a detailed description thereof is omitted.

The drain electrode WD2 includes a fourth electrode portion D4 which is put in contact with the other end portion of the semiconductor layer SC, a fifth electrode portion D5 which is continuous with one end portion of the fourth electrode portion D4, and a sixth electrode portion D6 which is continuous with the other end portion of the first electrode portion D4. The fourth electrode portion D4, fifth electrode portion D5 and sixth electrode portion D6 are formed integral or continuous, and are electrically connected to each other.

The fourth electrode portion D4 is put in contact with the semiconductor layer SC on the side opposite to the first electrode portion D1, with the source electrode WS interposed, and linearly extends in the second direction Y. The fourth electrode portion D4 is formed in a strip shape with a substantially uniform width in the first direction X. In the fourth electrode portion D4, an area between one end portion and the other end portion thereof is put in contact with the semiconductor layer SC. The fifth electrode portion D5 and sixth electrode portion D6 linearly extend in the first direction X from the fourth electrode portion D4 to a side opposite to the source line S1. In the example illustrated, each of the fifth electrode portion D5 and sixth electrode portion D6 extends in the first direction X from the position of connection to the fourth electrode portion D4 toward the right side end portion of the pixel PX. Specifically, each of the fifth electrode portion D5 and sixth electrode portion D6 extends in a direction opposite to the direction of extension of each of the second electrode portion D2 and third electrode portion D3, with the source line S1 being positioned at the center. Each of the fifth electrode portion D5 and sixth electrode portion D6 is formed in a strip shape with a substantially uniform width in the second direction Y.

The second electrode portion D2 and fifth electrode portion D5 are opposed to the storage capacitance line C1 and are located immediately below the main pixel electrode PA1. The storage capacitance line C1 linearly extends immediately below the second electrode portion D2 and fifth electrode portion D5 in the first direction X. In addition, the third electrode portion D3 and sixth electrode portion D6 are opposed to the storage capacitance line C2, and are located immediately below the main pixel electrode PA2. The storage capacitance line C2 linearly extends immediately below the third electrode portion D3 and sixth electrode portion D6 in the first direction X.

In the drain electrode WD1, a capacitance which is necessary for image display in the pixel PX can be formed between the second electrode portion D2 and storage capacitance line C1 and between the third electrode portion D3 and storage capacitance line C2. In addition, in the drain electrode WD2, a capacitance which is necessary for image display in the pixel PX can be formed between the fifth electrode portion D5 and storage capacitance line C1 and between the sixth electrode portion D6 and storage capacitance line C2.

The array substrate AR of this structure example can be combined with the counter-substrate CT shown in FIG. 3. In this case, the main common electrode CAC is located above the gate line G1.

Also in this structure example, the same advantageous effects as in the above-described structure example can be obtained. In addition, according to this structure example, capacitances can be formed between the storage capacitance line C1 and storage capacitance line C2, on the one hand, and the drain electrode WD1 and drain electrode WD2, on the other hand, which are opposed via the first insulation film 11. Therefore, compared to the case of forming a capacitance in the state in which a plurality of insulation films are interposed between the storage capacitance line C1 and storage capacitance line C2 and the pixel electrode PE, a greater capacitance can efficiently be formed with a smaller area.

In the meantime, the above-described drain electrode WD1 may be formed in a loop shape by disposing an electrode portion, which connects end portions of the second electrode portion D2 and third electrode portion D3, in the vicinity of the left side end portion of the pixel PX. In addition, the drain electrode WD2 may be formed in a loop shape by disposing an electrode portion, which connects end portions of the fifth electrode portion D5 and sixth electrode portion D6, in the vicinity of the right side end portion of the pixel PX. In this case, redundancy can be improved with respect to breakage of the drain electrode WD1 and drain electrode WD2.

According to this structure example, each of the drain electrode WD1 and drain electrode WD2 may be used as a pixel electrode. In this case, the second insulation film, third insulation film and pixel electrode PE formed of, e.g. ITO, which are located above the drain electrodes, can be omitted. The drain electrode WD1 and drain electrode WD2 are formed of a wiring material in which no indium (In) is used. Thus, compared to the case in which both the pixel electrode PE and common electrode CE are formed of ITO or IZO, the amount of use of indium can be reduced. Moreover, an indium-free structure can be realized in the case where not only the drain electrode WD1 and drain electrode WD2 but also the common electrode CE is formed of an electrically conductive material in which no indium (In) is used.

In the structure example in which the drain electrode WD1 and drain electrode WD2 functioning as the pixel electrode are formed of the above-described opaque wiring material, linearly polarized light, which has entered the liquid crystal display panel LPN, is substantially parallel or substantially perpendicular to the direction of extension of the edges of the drain electrodes. In addition, the direction of extension of the gate line G, storage capacitance line C and source line S, which are formed of the above-described opaque wiring material, is substantially parallel or substantially perpendicular to the linearly polarized light which has entered the liquid crystal display panel LPN. In addition, there is a case in which the common electrode CE is also formed of the above-described opaque electrically conductive material, and the direction of extension of the common electrode CE is substantially parallel or substantially perpendicular to the linearly polarized light which has entered the liquid crystal display panel LPN. Thus, the plane of polarization of the linearly polarized light, which is reflected by the edges of the drain electrode WD or common electrode CE, the gate line G, storage capacitance line C and source line S, is hardly disturbed, and the plane of polarization at the time of passing through the first polarizer PL1, which is a polarizer, can be maintained. Accordingly, at the OFF time, since linearly polarized light, which has passed through the liquid crystal display panel LPN, is sufficiently absorbed by the second polarizer PL2, which is an analyzer, light leakage can be suppressed. Specifically, the transmittance can be sufficiently reduced at the time of black display, and the decrease in contrast ratio can be suppressed. In addition, since there is no need to increase the width of a black matrix in order to cope with light leakage in the vicinity of the drain electrode WD or common electrode CE, it is possible to suppress a decrease in area of the transmissive region or a decrease in transmittance at the ON time. Therefore, degradation in display quality can be suppressed.

As has been described above, according to the present embodiment, a liquid crystal display device, which can realize cost reduction and can suppress degradation in display quality, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first storage capacitance line and a second storage capacitance line each extending in a first direction, a gate line which is located between the first storage capacitance line and the second storage capacitance line and extends in the first direction, a semiconductor layer which is located at a substantially central part of a pixel and located above the gate line, a source line which is put in contact with the semiconductor layer and extends in a second direction crossing the first direction, a drain electrode which is put in contact with the semiconductor layer and extends above the first storage capacitance line and the second storage capacitance line, and a pixel electrode including a first main pixel electrode which is electrically connected to the drain electrode, is opposed to the first storage capacitance line and extends in the first direction, and a second main pixel electrode which is electrically connected to the drain electrode, is opposed to the second storage capacitance line and extends in the first direction;
a second substrate including a common electrode, the common electrode including main common electrodes which extend in the first direction and are located on both sides of the first main pixel electrode and on both sides of the second main pixel electrode; and
a liquid crystal layer held between the first substrate and the second substrate.

2. The liquid crystal display device of claim 1, wherein the main common electrode, which is located between the first main pixel electrode and the second main pixel electrode, is located above the gate line.

3. The liquid crystal display device of claim 2, wherein the gate line is located at a substantially middle point between the first storage capacitance line and the second storage capacitance line.

4. The liquid crystal display device of claim 3, wherein the second substrate includes a sub-common electrode which is continuous with the main common electrodes and extends in the second direction.

5. The liquid crystal display device of claim 4, wherein the pixel in which the pixel electrode is disposed has a laterally elongated shape having a greater length in the first direction than in the second direction.

6. The liquid crystal display device of claim 1, wherein the first substrate further includes a gate shield electrode which is opposed to the gate line and has the same potential as the common electrode.

7. The liquid crystal display device of claim 1, wherein the pixel electrode is formed in a loop shape.

8. The liquid crystal display device of claim 1, wherein the drain electrode includes a first electrode portion which is put in contact with the semiconductor layer and extends in the second direction, a second electrode portion which is continuous with one end portion of the first electrode portion, is opposed to the first storage capacitance line and extends in the first direction to a side opposite to the source line, and a third electrode portion which is continuous with the other end portion of the first electrode portion, is opposed to the second storage capacitance line and extends in the first direction to the side opposite to the source line.

9. A liquid crystal display device comprising:
a first substrate including a first storage capacitance line and a second storage capacitance line each extending in a first direction, a gate line which is located between the first storage capacitance line and the second storage capacitance line and extends in the first direction, a semiconductor layer which is located at a substantially central part of a pixel and located above the gate line, a source line which is put in contact with the semiconductor layer and extends in a second direction crossing the first direction, a drain electrode including a first drain electrode and a second drain electrode configured such that the source line is located between the first drain electrode and the second drain electrode, the first drain electrode being in contact with one end portion of the semiconductor layer and extending above the first storage capacitance line and the second storage capacitance line, the second drain electrode being in contact with the other end portion of the semiconductor layer and extending above the first storage capacitance line and the second storage capacitance line, and a pixel electrode including a first main pixel electrode which is electrically connected to the first drain electrode and the second drain electrode, is opposed to the first storage capacitance line and extends in the first direction, and a second main pixel electrode which is electrically connected to the first drain electrode and the second drain electrode, is opposed to the second storage capacitance line and extends in the first direction;
a second substrate including a common electrode, the common electrode including main common electrodes which extend in the first direction and are located on both sides of the first main pixel electrode and on both sides of the second main pixel electrode; and
a liquid crystal layer held between the first substrate and the second substrate.

10. The liquid crystal display device of claim 9, wherein the main common electrode, which is located between the first main pixel electrode and the second main pixel electrode, is located above the gate line.

11. The liquid crystal display device of claim 10, wherein the gate line is located at a substantially middle point between the first storage capacitance line and the second storage capacitance line.

12. The liquid crystal display device of claim 11, wherein the second substrate includes a sub-common electrode which is continuous with the main common electrodes and extends in the second direction.

13. The liquid crystal display device of claim 12, wherein the pixel in which the pixel electrode is disposed has a laterally elongated shape having a greater length in the first direction than in the second direction.

14. The liquid crystal display device of claim 9, wherein the first substrate further includes a gate shield electrode which is opposed to the gate line and has the same potential as the common electrode.

15. The liquid crystal display device of claim 9, wherein the pixel electrode is formed in a loop shape.

16. The liquid crystal display device of claim 9, wherein the first drain electrode includes a first electrode portion which is put in contact with one end portion of the semiconductor layer and extends in the second direction, a second electrode portion which is continuous with one end portion of the first electrode portion, is opposed to the first storage capacitance line and extends in the first direction to a side opposite to the source line, and a third electrode portion which is continuous with the other end portion of the first electrode portion, is opposed to the second storage capacitance line and extends in the first direction to the side opposite to the source line, and
the second drain electrode includes a fourth electrode portion which is put in contact with the other end portion of the semiconductor layer and extends in the second direction, a fifth electrode portion which is continuous with one end portion of the fourth electrode portion, is opposed to the first storage capacitance line and extends in the first direction to a side opposite to the source line, and a sixth electrode portion which is continuous with the other end portion of the fourth electrode portion, is opposed to the second storage capacitance line and extends in the first direction to the side opposite to the source line.

17. A liquid crystal display device comprising:
a first substrate including a first storage capacitance line and a second storage capacitance line each extending in a first direction, a gate line which is located between the first storage capacitance line and the second storage capacitance line and extends in the first direction, a semiconductor layer which is located at a substantially central part of a pixel and located above the gate line, a source line which is put in contact with the semiconductor layer and extends in a second direction crossing the first direction, a drain electrode which is put in contact with the semiconductor layer and extends above the first storage capacitance line and the second storage capacitance line, and a pixel electrode disposed in the pixel having a laterally elongated shape with a greater length in the first direction than in the second direction, the pixel electrode including a first main pixel electrode which is electrically connected to the drain electrode, is opposed to the first storage capacitance line and extends in the first direction, and a second main pixel electrode which is electrically connected to the drain electrode, is opposed to the second storage capacitance line and extends in the first direction;
a second substrate including a common electrode, the common electrode including main common electrodes which extend in the first direction and are located on both sides of the first main pixel electrode and on both sides of the second main pixel electrode; and
a liquid crystal layer held between the first substrate and the second substrate.

18. The liquid crystal display device of claim 17, wherein the main common electrode, which is located between the first main pixel electrode and the second main pixel electrode, is located above the gate line.

19. The liquid crystal display device of claim 18, wherein the gate line is located at a substantially middle point between the first storage capacitance line and the second storage capacitance line.

20. The liquid crystal display device of claim 19, wherein the second substrate includes a sub-common electrode which is continuous with the main common electrodes and extends in the second direction.

* * * * *